(12) United States Patent
Tirkkonen et al.

(10) Patent No.: US 9,077,516 B2
(45) Date of Patent: Jul. 7, 2015

(54) REDUCED COMPLEXITY FREQUENCY DOMAIN EQUALIZATION OF MULTIPLE INPUT MULTIPLE OUTPUT CHANNELS

(75) Inventors: Olav Tirkkonen, Helsinki (FI); Mikko Kokkonen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1546 days.

(21) Appl. No.: 11/628,634

(22) PCT Filed: Jun. 18, 2004

(86) PCT No.: PCT/IB2004/002032
§ 371 (c)(1),
(2), (4) Date: Dec. 4, 2006

(87) PCT Pub. No.: WO2006/008565
PCT Pub. Date: Jan. 26, 2006

(65) Prior Publication Data
US 2007/0253476 A1  Nov. 1, 2007

(51) Int. Cl.
*H03H 7/40* (2006.01)
*H04L 27/00* (2006.01)
(Continued)

(52) U.S. Cl.
CPC ............. *H04L 1/06* (2013.01); *H04L 25/0204* (2013.01); *H04L 25/0244* (2013.01);
(Continued)

(58) Field of Classification Search
USPC ......... 375/229–236, 219, 220, 295, 296, 316, 375/346–348, 350, 358, 240.26–240.29, 375/222, 147, 136, 146, 135, 324, 340, 343, 375/349
See application file for complete search history.

(56) References Cited

U.S. PATENT DOCUMENTS 6,144,711 A    11/2000  Raleigh et al.
6,452,981 B1 *  9/2002  Raleigh et al. ............... 375/299
(Continued)

FOREIGN PATENT DOCUMENTS

EP    1 301 003    4/2003

OTHER PUBLICATIONS

Vankka et al, "A Multicarrier QAM Modulator", Jan. 2000, IEEE Transactions on Circuits and Systems—II: Analog and Digital Signal Processing, vol. 47, No. 1, pp. 1-10.*

(Continued)

*Primary Examiner* — Linda Wong
(74) *Attorney, Agent, or Firm* — Harrington & Smith

(57) ABSTRACT

A method for equalizing a frequency-selective transmission channel (103) with N inputs and $M_R$ outputs is shown, the transmission channel representable in a transformation domain based on N orthogonal sub-carriers, and wherein the transmission characteristics from the $M_T$ inputs to the $M_R$ outputs for each of the N respective orthogonal sub-carriers are represented by N respective sub-carrier channels (201), the method using (904) equalization filters (301, 302) for at least two of the N sub-carrier channels, wherein at least one set (501) of sub-carrier channels comprising at least two of the N sub-carrier channels is formed (901), wherein for at least one sub-carrier channel, a first-type equalization filter is used that is determined (902) based on a representation of at least one sub-carrier channel, and wherein for at least one sub-carrier channel, a second-type equalization filter is used that is derived (903) at least partially from the first-type equalization filter.

54 Claims, 8 Drawing Sheets

(51) Int. Cl.
*H04L 1/06* (2006.01)
*H04L 25/02* (2006.01)
*H04L 25/03* (2006.01)

(52) U.S. Cl.
CPC ..... *H04L 25/0248* (2013.01); *H04L 25/03159* (2013.01); *H04L 2025/03375* (2013.01); *H04L 2025/03522* (2013.01)

(56) References Cited

U.S. PATENT DOCUMENTS

| | | | |
|---|---|---|---|
| 6,560,299 B1* | 5/2003 | Strolle et al. | 375/347 |
| 6,741,643 B1* | 5/2004 | McGibney | 375/229 |
| 7,054,375 B2* | 5/2006 | Kannan et al. | 375/260 |
| 7,099,386 B2* | 8/2006 | Krupka | 375/232 |
| 7,184,713 B2* | 2/2007 | Kadous et al. | 455/67.13 |
| 7,218,689 B2* | 5/2007 | Gupta | 375/340 |
| 7,248,879 B1* | 7/2007 | Walton et al. | 455/452.2 |
| 7,283,598 B2* | 10/2007 | Akita et al. | 375/316 |
| 2002/0122499 A1* | 9/2002 | Kannan et al. | 375/260 |
| 2002/0181438 A1* | 12/2002 | McGibney | 370/350 |
| 2003/0012314 A1* | 1/2003 | Krupka | 375/346 |
| 2003/0072382 A1* | 4/2003 | Raleigh et al. | 375/267 |
| 2003/0095508 A1* | 5/2003 | Kadous et al. | 370/252 |
| 2003/0134607 A1* | 7/2003 | Raghavan et al. | 455/132 |
| 2003/0169824 A1* | 9/2003 | Chayat | 375/260 |
| 2003/0231726 A1* | 12/2003 | Schuchert et al. | 375/350 |
| 2004/0062302 A1* | 4/2004 | Fujii et al. | 375/232 |
| 2004/0095907 A1* | 5/2004 | Agee et al. | 370/334 |
| 2004/0100897 A1* | 5/2004 | Shattil | 370/206 |
| 2004/0141548 A1* | 7/2004 | Shattil | 375/146 |
| 2005/0031047 A1* | 2/2005 | Maltsev et al. | 375/260 |
| 2005/0047515 A1* | 3/2005 | Walton et al. | 375/267 |
| 2005/0053229 A1* | 3/2005 | Tsatsanis et al. | 379/406.01 |
| 2005/0078762 A1* | 4/2005 | Ketchum et al. | 375/267 |
| 2005/0111599 A1* | 5/2005 | Walton et al. | 375/347 |
| 2005/0129137 A1* | 6/2005 | Yamada et al. | 375/267 |

OTHER PUBLICATIONS

3GPP TSG RAN WG1 #35, Lisboa, Portugal, Nov. 17-21, 2003 "Adaptive subcarrier allocation and modulation scheme selection in OFDM System" pp. 1-12.

"Pre-Equalization for MIMO Wireless Channels with Delay Spread" by H. Sampath, et al, IEEE VTC 2000, Boston, MA, Sep. 2000.

3GPP TSG-RAN1 #28bis, Espoo, Finland, Oct. 8-9, 2002, "Frequency scheduling and joint power and rate optimization for OFDM", pp. 1-4.

"Performance of linear interpolation-based MIMO detection for MIMO-OFDM systems" by D. Jingming Wang, Wireless Communications and Networking Conference, vol. 2, Mar. 21, 2004, pp. 981-986, XP010708264, Piscataway, U.S.

"A novel approach to signal detection in MIMO-OFDM systems combining coding and joint detection techniques" by Anxin et al, IEEE Symposium on Circuits and Systems, vol. 2, May 31, 2004, pp. 587-590, XP010716137, Piscataway, U.S.

"Impulse shortening and equalization of frequency-selective MIMO channels with respect to layered space-time architectures" by K. Wubben, Signal Processing, vol. 83, No. 8, Aug. 2003, pp. 1643-1659, XP004433469, Amsterdam, NL.

* cited by examiner

REDUCED COMPLEXITY FREQUENCY DOMAIN EQUALIZATION OF MULTIPLE INPUT MULTIPLE OUTPUT CHANNELS

CROSS-REFERENCE TO RELATED APPLICATION

This application is the U.S. National Stage of International Application Number PCT/IB2004/002032 filed Jun. 18, 2004 and published in English on Jan. 26, 2006 under International Publication Number WO 2006/008565 A1.

FIELD OF THE INVENTION

This invention relates to a method, a device, a system, a computer program and a computer program product for equalizing a frequency-selective transmission channel with $M_T$ inputs and $M_R$ outputs.

BACKGROUND OF THE INVENTION

In the development of radio communication systems of the third (3G) and fourth (4G) generation, particular emphasis is put on the exploitation of the spatial domain of the transmission medium in order to increase the spectral efficiency (measured in bit/s/Hz) of these systems. To exploit the spatial domain, at least two antenna elements have to be provided at a transmitter and/or receiver of a radio communication system, for instance in the shape of an antenna array with at least two antenna elements. By base-band manipulation of the signals fed to these antenna elements or received from these antenna elements, it becomes then possible to transmit and/or receive signals in a spatially selective fashion, for instance to place a peak of the transmission and/or reception antenna characteristic of the antenna array towards the direction of a desired user and to place a transmission and/or reception null towards the direction of an interferer. The deployment of an antenna array in a radio communication system that uses Time Division, Frequency Division or Code Division Multiple Access (TDMA, FDMA, CDMA) to control the access of several users to the shared transmission medium further allows for the incorporation of a Space Division Multiple Access (SDMA) component. For instance, in a pure TDMA system, wherein users are separated in the time domain, it becomes possible to assign two or more users the same time slot for transmission, because their signals can be spatially separated under exploitation of the spatial domain. Similarly, if only one multi-antenna transmitter and one multi-antenna receiver is present, it becomes possible to establish several orthogonal spatial channels between said transmitter and receiver for the transmission of several concurrent data streams between the two of them.

The basic transmission and reception of signals in a radio communication system with multiple antennas at the transmit and/or receive site is described by the standard base-band space-time system model, assuming ideal D/A conversion and modulation at the transmit site and ideal demodulation and A/D conversion at the receive site:

$$x(k)=G(k)z(k)+I(k). \quad (1)$$

Therein, k is a burst index, i.e. it is assumed that signals are transmitted in bursts containing a number of N symbols each. It is assumed that at a transmit site, $M_T$ transmit antenna elements are available, and that at a receive site, $M_R$ receive antenna elements are available. These transmit and receive antenna elements can be assigned to one transmitter or receiver, respectively, or be assigned to more than one transmitter or receiver. For instance, there may be one transmitter with an antenna array with $M_T$ antenna elements or $M_T$ single-antenna transmitters, and one receiver with an antenna array with $M_R$ antenna elements or $M_R$ single-antenna receivers. From each transmit antenna element $m_T=1, \ldots, M_T$, one transmit signal with $n=1, \ldots, N$ symbols $z_{m_T}(n)$ is transmitted. These $M_T$ transmit signals are stacked in the transmit signal vector $$z(k)=[z_1(1) \ldots z_1(N) \ldots z_{M_T}(1) \ldots z_{M_T}(N)]^T.$$

Correspondingly, the symbols $x_{m_R}(n)$ received at receive antenna element $m_R=1, \ldots, M_R$ at time instant $n=1, \ldots, N+v$ in response to the transmission of said transmit symbols $z_{m_T}(n)$ are stacked in the receive signal vector $$x(k)=[x_1(1) \ldots x_1(N+v) \ldots x_{M_R}(1) \ldots x_{M_R}(N+v)]^T,$$

wherein the parameter v will be explained below.

The actual mapping of said transmit signal vector z(k) onto said receive signal vector x(k) is performed by the space-time Multiple Input Multiple Output (MIMO) channel matrix $$G(k) = \begin{pmatrix} G_{1,1}(k) & \cdots & G_{1,M_T}(k) \\ \vdots & \ddots & \vdots \\ G_{M_R,1}(k) & \cdots & G_{M_R,M_T}(k) \end{pmatrix} \in C^{(N+v)M_R \times NM_T}. \quad (2)$$

Therein, the space-time Single Input Single Output (SISO) blocks $G_{m_R,m_T}(k)$ are Toeplitz matrices that are composed of shifted versions of the channel impulse response of the physical transmission (or propagation) channel between transmit antenna $m_T$ and receive antenna $m_R$ with an assumed number of (v+1) taps. It is understood that the space-time MIMO channel matrix is assumed to be substantially time-invariant (i.e. constant) during the transmission of at least one burst. The space-time MIMO channel matrix contains all physical propagation effects between the $M_T$ transmit antenna elements and the $M_R$ receive antenna elements such as for instance propagation delay; path loss; large-scale fading due to shadowing; small-scale fading due to multi-path propagation; receivers or scatterers in the transmission channel; and scattering, diffraction and refraction effects. Furthermore, all hardware characteristics effecting the signal during the transmission from the transmitter baseband to the receiver baseband are lumped to the space-time MIMO channel matrix as well, as for instance pulse shape filters, correlations due to antenna coupling or calibration errors, phase shifts due to non-ideal mixing or lack of transmitter-receiver clock synchronism, or delays due to filtering times.

Finally, the vector $$I(k)=[I_1(1) \ldots I_1(N+v) \ldots I_{M_R}(1) \ldots I_{M_R}(N+v)]^T$$

contains the noise $I_{m_R}(n)$ received at each time instant $n=1, \ldots, N+v$ at receive antenna element $m_R=1, \ldots, M_R$. Said noise contribution may represent thermal noise as well as signals from interferers (for instance intra-cell, inter-cell and inter-system interferers).

If the transmission channel between at least one transmit antenna element $m_T$ and one receive antenna element $m_R$ is frequency-selective, i.e. the coherence bandwidth of said transmission channel is substantially smaller than the bandwidth of transmit signals that are to be transmitted over said transmission channel, even in the simple case of $M_T=1$ transmit antenna and $M_R=1$ receive antenna, the receive signal x(k) will be heavily distorted even in the noise-free case. To obtain a reconstruction of the transmit signal, these distortions have to be mitigated or removed. This may be accomplished before the transmission of said transmit signal, after the transmission, or before and after said transmission by equalization of the MIMO channel. Throughout this specification, the term equalization will be used for any signal processing at the transmitter and/or receiver site that at least partially aims at a mitigation or removal of signal distortions experienced during the transmission of signals over a transmission channel and/or at least partially aims at a mitigation or removal of interference between signals transmitted over said transmission channel and/or at least partially aims at an improvement of the Signal-to-Noise Ratio (SNR) or the Signal-to-Noise-and-Interference Ratio (SNIR) of at least one reconstruction or estimate of said signals transmitted over said transmission channel.

Time domain based equalization of the space-time MIMO channel generally involves inversions of the space-time MIMO channel matrix G(k) or functions thereof. For instance, if Zero-Forcing (ZF) equalization of the MIMO channel matrix at the receiver site is desired, the left pseudo-inverse of the space-time MIMO channel matrix G(k) has to be computed, which requires complex multiplications of the order $(NM_T)^3$. It is thus evident that with increasing numbers of transmitted symbols N and increasing numbers of transmit antenna elements $M_T$, time domain based equalization of the MIMO channel becomes unfeasible.

A particular reduction of the computational complexity encountered in the equalization of the space-time MIMO channel can be achieved by exploiting the block-Toeplitz structure of the space-time MIMO channel matrix G(k). This is achieved by transforming the space-time SISO blocks $G_{m_R,m_T}(k)$ in the space-time MIMO channel matrix G(k) into circulant blocks $\tilde{G}_{m_R,m_T}(k)$ of dimension N×N (i.e., the i-th row is equal to the j-th row cyclically shifted by i-j elements), yielding a space-time MIMO channel matrix G(k) composed of circulant blocks. Note that, for ease of presentation, in the following part of the description, the burst index k will be skipped.

As shown in U.S. Pat. No. 6,144,711, cyclic matrices can be diagonalized via Fourier and inverse Fourier transformations. In the present case, the cyclic SISO blocks $\tilde{G}_{m_R,m_T}$ within $\tilde{G}$ can be transformed into diagonal matrices $D_{m_R,m_T}$ by the following operation:

$$Y_{(M_R)}\tilde{G}Y_{(M_T)}^H = \begin{pmatrix} D_{1,1} & \cdots & D_{1,M_T} \\ \vdots & \ddots & \vdots \\ D_{M_R,1} & \cdots & D_{M_R,M_T} \end{pmatrix}, \quad (6)$$

wherein $$Y_{(M)} = \begin{pmatrix} Y & & 0 \\ & \ddots & \\ 0 & & Y \end{pmatrix} \quad (7)$$

contains M N×N Fourier transformation matrices Y on its diagonal, the elements of which are defined as $$y_{m,n} = \frac{1}{\sqrt{N}} e^{-j2\pi mn/N},$$

and wherein $Y_{(M)}^H$ is the corresponding inverse Fourier transformation matrix. Note that the multiplication with the Fourier transformation matrix and with the inverse Fourier transformation matrix may be efficiently implemented via a Fast Fourier Transformation (FFT) and an Inverse Fast Fourier Transformation (IFFT), in particular when N is a power of 2. A block-diagonalization (the resulting matrix then has only blocks on the diagonal and zeros elsewhere) of the space-time MIMO channel matrix $\tilde{G}$ can then be achieved by applying unitary permutation matrices $P_R$ and $P_T$ in the following way:

$$P_R Y_{(M_R)} \tilde{G} Y_{(M_T)}^H P_T \equiv H = \begin{pmatrix} H(1) & & 0 \\ & \ddots & \\ 0 & & H(N) \end{pmatrix}, \quad (8)$$

wherein H is a block-diagonal space-frequency MIMO channel matrix containing the $M_R \times M_T$ blocks H(n) with n=1, . . . , N on its diagonal. The block-diagonal space-frequency MIMO channel matrix H possesses the desirable feature that symbols transmitted over a channel as described by H suffer only from multiple access interference which may be spatial interference, and may typically be caused by transmissions of the user himself (caused by spatial correlations within the blocks H(n)), but no longer from intersymbol interference (originally caused by the frequency-selectivity of the space-time MIMO channel). Due to the Fourier and inverse Fourier transformations applied to the space-time MIMO channel matrix $\tilde{G}$ in the process of block-diagonalization, the total bandwidth of the space-time MIMO channel is considered to be divided into N subbands or sub-carriers, wherein the frequency-flat transmission channel of each of said N sub-carriers is represented by a respective $M_R \times M_T$ sub-carrier channel H(n), so that sub-carrier channel H(n) defines the mapping of the frequency components of transmission signals transmitted from the $M_T$ transmit antenna elements to frequency components of receive signals received at the $M_R$ receive antenna elements.

To attain that the transmitted symbols "see" only the space-frequency MIMO channel matrix H of equation (8) during their transmission, pre-processing is required at the transmitter, and post-processing is required at the receiver. Furthermore, a re-ordering of the transmit symbols $z_{m_T}((n)$ into N $M_T$-element transmit signal vectors $$z(n)=z[z_1(n) \ldots z_{M_T}(n)]^T$$

with n=1, . . . , N, and a re-ordering of the receive symbols $x_{m_R}(n)$ into N $M_R$-element receive signal vectors $$x(n)=[x_1(n) \ldots x_{M_R}(n)]^T$$

with n=1, . . . , N is required.

Equation (8) clearly defines the shape of the processing required at the transmitter and receiver site, which is schematically depicted in FIG. 1 (as in U.S. Pat. No. 6,144,711): At the transmitter, first a permutation operation has to be performed on the transmit signal vectors z(n) (matrix $P_T$), and subsequently an inverse Fourier transformation is required (matrix $Y_{(M_T)}^H$, block 101). At the receiver, first a Fourier transformation (matrix $Y_{(M_R)}$ block 105) and then a permutation operation (matrix $P_R$) is performed on the signals received at the $M_R$ receive antenna elements, yielding the receive signal vectors x(n). Keeping in mind that the space-time MIMO channel matrix is actually composed of Toeplitz blocks (MIMO matrix G with SISO blocks $G_{m_R,m_T}$ 103, also cf. equation (2)), and not of circulant blocks (matrix $\tilde{G}$), this difference has to be taken care of at the transmitter and receiver site. This is achieved by adding a cyclic prefix of length at least v (the last v symbols of a signal are copied and prepended before the first symbol of the respective signal) to the signals that leave the inverse Fourier transformation block 101, and by removing the first v symbols of the signals received at the $M_R$ receive antenna elements at the receiver site in a block 104.

The inverse Fourier transformation performed in blocks 101 at the transmitter site reflects the fact that the transmit symbols are considered to be frequency domain symbols that have to be transformed to the time domain in order to be transmitted over the space-time MIMO channel $\tilde{G}$. Similarly, the Fourier transformation performed in blocks 105 at the receiver site reflects that the time domain receive signals as output by the space-time MIMO channel $\tilde{G}$ have to be converted back to the frequency domain.

The system set-up of FIG. 1 can then be conveniently described by a decoupled space-frequency system model:

$$x(n)=H(n)z(n)+I(n), \qquad (9)$$

with $n=1, \ldots, N$. This decoupled system model with the sub-carrier channel $H(n)$ being represented by block 201 is depicted in FIG. 2.

The system of FIG. 2 is capable of transmitting $M_T$ transmit symbols $z_{m_T}(n)$ over an $M_R \times M_T$ channel $H(n)$, wherein the only interference arising in this transmission stems from multiple access interference between the $M_T$ transmit symbols transmitted over the same channel $H(n)$. The space-time MIMO transmission system thus can be represented by N decoupled space-frequency transmission systems as depicted in FIG. 2.

To remove or mitigate the remaining multiple access interference between the $M_T$ transmit symbols transmitted over the same sub-carrier channel $H(n)$, equalization can be applied to said sub-carrier channels $H(n)$, either by applying a pre-equalization filter $W_T(n)$ at the transmitter site, a post-equalization filter $W_R(n)$ at the receiver site, or pre- and post-equalization filters $W_T(n)$ and $W_R(n)$ at both the transmitter and the receiver site.

This approach is schematically depicted in FIG. 3, wherein the pre-equalization is represented by block 301, and the post equalization is represented by block 302. At each sub-carrier channel index $n=1, \ldots, N$, the pre-equalization filter $W_T(n)$ allows to map K symbols $s_k(n)$ with $k=1, \ldots, K$ onto the $M_T$ transmit symbols $z_{m_T}(n)$ with $m_T=1, \ldots, M_T$. Said K symbols $s_k(n)$ with $n=1, \ldots, N$ represent symbols of K signals that are to be transmitted over said transmission channel. By properly choosing the pre-equalization filter $W_T(n)$, it is not only possible to transmit a number of signals K that differs from the number of transmit antenna elements $M_T$, but to perform pre-equalization of the sub-carrier channels $H(n)$ in a way that, for example, multiple access interference between the K signals is mitigated or removed. In addition to or instead of said pre-equalization, a post-equalization may be performed at the receiver site, which maps the $M_R$ receive symbols $x_{m_R}(n)$ to K reconstructed symbols $\hat{s}_k(n)$.

For the case when only pre-equalization is performed, the post-equalization matrix may for instance equal the identity matrix, $K=M_R$ may hold, and the reconstructed symbols $\hat{s}_k(n)$ then may equal the receive symbols H. Similarly, for the case when only post-equalization is performed, the pre-equalization matrix may equal the identity matrix, $K=M_T$ may hold, and the transmit symbols $z_{m_T}(n)$ may equal the symbols $s_k(n)$ that are to be transmitted over the transmission channel.

For instance, if Zero-Forcing (ZF) post-equalization of the sub-carrier channels $H(n)$ at the receiver site is desired, at each sub-carrier channel index $n=1, \ldots, N$, the left pseudo-inverse $W_R(n)=(H^H(n)H(n))^{-1}H^H(n)$ of each sub-carrier channel $H(n)$ has to be computed based on estimates of said sub-carrier channels $H(n)$. It is readily seen that the computation of the left pseudo inverse for each sub-carrier channel has to be performed N times and requires only $M_T^3$ complex multiplications each, so that, in contrast to ZF being applied to the space-time MIMO channel matrix G, which requires $(NM_T)^3$ complex multiplications, a huge saving in computational costs is achieved by equalizing the space-frequency channel instead of the space-time channel (the computational effort for implementing the Fourier and inverse Fourier transformations and the permutations can be neglected compared to the computational effort for the matrix inversions).

However, the remaining computational effort required to equalize the space-frequency MIMO channel can still be considerate in particular for large numbers of transmitted symbols and for large numbers of antenna elements. To reduce the computational complexity, U.S. Pat. No. 6,144, 711 thus proposes to use the same equalization filters for all N sub-carrier channels $H(n)$. With the N sub-carrier channels $H(n)$ being roughly equal only for frequency-flat transmission channels, this proposal is however not suited for frequency-selective transmission channels, where at least some of the N sub-carrier channels $H(n)$ are substantially different from each other.

SUMMARY OF THE INVENTION

It is, inter alia, an object of the present invention to provide a reduced-complexity method, computer program, computer program product, device and system for equalizing a frequency-selective transmission channel with $M_T$ inputs and $M_R$ outputs.

A method is proposed for equalizing a frequency-selective transmission channel with $M_T$ inputs and $M_R$ outputs, wherein said transmission channel can be represented in a transformation domain based on N orthogonal sub-carriers, and wherein the transmission characteristics from said $M_T$ inputs to said $M_R$ outputs of said transmission channel for each of said N respective orthogonal sub-carriers in said transformation domain are represented by N respective sub-carrier channels, the method comprising using equalization filters for at least two of said N sub-carrier channels, wherein at least one set of sub-carrier channels comprising at least two of said N sub-carrier channels is formed, wherein for at least one sub-carrier channel in said at least one set of sub-carrier channels, a first-type equalization filter is used that is determined based on a representation of at least one sub-carrier channel of said at least one set of sub-carrier channels, and wherein for at least one sub-carrier channel in said at least one set of sub-carrier channels, a second-type equalization filter is used that is derived at least partially from said first-type equalization filter.

Said frequency-selective transmission channel may for instance represent a MIMO channel between one or several transmitters and one or several receivers. Said channel may be a wireless or wire-bound channel. Said channel possesses $M_T$ inputs and $M_R$ outputs. In a wireless channel, said inputs and outputs may be understood as antenna ports of antenna elements at the transmitter and receiver site of said channel, respectively. Said antenna elements may provide different polarizations, so that for instance two antenna ports may be associated with one dual-polarization antenna element. Said antenna elements at either site of said channel may belong to one or several transmitter and receivers, respectively. For instance, there may be $M_T$ single-antenna transmitters, or only one transmitter with an antenna array with $M_T$ antenna elements. Similarly, there may be $M_R$ single-antenna receivers or one receiver with an antenna array with $M_R$ antenna elements. Equally well, the numbers of antenna elements per transmitter and receiver may vary among the transmitters and receivers, respectively. Said antenna elements may represent all means being capable of transforming a guided electromagnetic wave into a free space electromagnetic wave. Said channel is frequency-selective, i.e. the coherence bandwidth of the channel is significantly smaller than the bandwidth of a signal that is to be transmitted over said transmission channel.

Said transmission channel can be represented in a transformation domain, wherein said transformation domain is based on N orthogonal sub-carriers. Said transformation domain may for instance be the frequency domain, wherein said sub-carriers are frequency sub-carriers; the Hilbert domain, wherein said sub-carriers are Hilbert sub-carriers; or the wavelet domain, wherein said sub-carriers are wavelet sub-carriers. Providing a representation of said transmission channel in said transformation domain may thus require the at least partial performance of a Fourier transformation, Hilbert transformation or wavelet transformation, respectively. The transmission characteristics from said $M_T$ inputs to said $M_R$ outputs of said transmission channel for each of said N respective orthogonal sub-carriers in said transformation domain are represented by N respective sub-carrier channels. Said transmission channel may thus completely be characterized by said N sub-carrier channels, wherein the orthogonality of said sub-carriers causes said sub-carrier channels to be decoupled. Said sub-carrier channels themselves may, however, not necessarily be orthogonal to each other.

For at least two of said N sub-carrier channels, an equalization filter is used at either the transmitter site, the receiver site, or at both sites. In the last case, said equalization filter is understood to be distributed over both the transmitter and receiver site. Said equalization filters may at least partially aim at a mitigation or removal of distortions experienced during the transmission of signal components over said sub-carrier channel; and/or may at least partially aim at a mitigation or removal of interference between signal components transmitted over said sub-carrier channels; and/or may at least partially aim at an improvement of the Signal-to-Noise Ratio (SNR) or the Signal-to-Noise-and-Interference Ratio (SNIR) of at least one reconstruction or estimate of said signal components transmitted over said sub-carrier channels. For instance, multiple access interference arising from several signals being transmitted concurrently over said transmission channel may be removed or mitigated by said equalization filters, or beamforming techniques may be applied to transmit and/or receive signal components in a spatially selective manner.

From said N sub-carrier channels, at least one set of sub-carrier channels is formed, which comprises at least two of said N sub-carrier channels. There may well be several sets of sub-carrier channels, and the number of sub-carrier channels per set may be the same for all sets or may be different.

At least for one sub-carrier channel in said at least one set of sub-carrier channels, a first-type equalization filter is used that is determined based on a representation of at least one sub-carrier channels of said at least one set of sub-carrier channels. Said representation of said at least one sub-carrier channel may for instance be an estimate or measurement or transformation of said at least one sub-carrier channel. Said first-type equalization filter may also be determined based on a representation of several sub-carrier channels, for instance based on an average or any other combination of a couple of sub-carrier channel estimates of one or several sets of sub-carrier channels.

At least for one sub-carrier channel in said at least one set of sub-carrier channels, a second-type equalization filter is used, which is determined based on at least said first-type equalization filter.

In the most simplest case, said second-type equalization filter may equal said first-type equalization filter. Then, for instance, said first-type equalization filter may be determined based on a representation of at least one sub-carrier channel in said at least one set of sub-carrier channels, and this equalization filter is used for several or all sub-carrier channels in said at least one set of sub-carrier channels.

Said second-type equalization filter may also be determined via interpolation and/or extrapolation techniques that are at least partially based on said first-type equalization filter. For instance, two respective first-type equalization filters may be determined for two respective sets of sub-carrier channels (based on a respective representation of one or several sub-carrier channels in said respective two sets of sub-carrier channels), and then a second-type equalization filter for at least one of said two sets of sub-carrier channels is determined from said two first-type equalization filters via interpolation.

Using said second-type equalization filter that is based on said first-type equalization filter can be considered as the fundamental step to reduce the computational complexity encountered in the equalization of frequency-selective transmission channels. A first-type equalization filter computed from a representation of at least one sub-carrier channels can be used to equalize all sub-carrier channels in said set of sub-carrier channels (if all second-type equalization filters used for the remaining sub-carrier channels in said set equal said first-type equalization filter), so that instead of having to compute equalization filters for all sub-carrier channels in said set, only one first-type equalization filter has to be computed. Alternatively, second-type equalization filters for some or all sub-carriers may be gained via inter- or extrapolation of only a few first-type respective equalization filters that are computed for two or more respective sets of sub-carrier channels. The present invention thus effectively reduces the computationally most expensive part of the equalization, namely the computation of equalization filters for each sub-carrier channel. The performance of this reduced-complexity equalization scheme as proposed by the present invention may depend on the technique how said representation of said at least one sub-carrier channel is determined, on the size of the sets of sub-carriers, on the way how the second-type equalization filters are derived from the first-type equalization filters, and on the differences between the sub-carrier channels.

Furthermore, in systems that perform equalization at the transmitter site, and in which equalization filters or sub-carrier channel information has to be fed back from a receiver to a transmitter, the amount of feedback can be significantly reduced, because only equalization filters or sub-carrier channel information of a fraction of the sub-carriers in each set may have to be fed back, for instance only said first-type equalization filters may be fed back.

According to a method of the present invention, at least two sets of sub-carrier channels are formed.

According to a method of the present invention, the number of sub-carrier channels in each of said at least two sets of sub-carrier channels is equal.

According to a method of the present invention, the number of sub-carrier channels in each of said at least two sets of sub-carrier channels is not equal.

According to a method of the present invention, said transformation domain is a frequency domain and said orthogonal sub-carriers are orthogonal frequency sub-carriers. To provide a representation of said transmission channel in said frequency domain, Fourier and inverse Fourier transformations or Fast Fourier Transformations (FFT) and Inverse Fast Fourier Transformations (IFFT) may have to be performed at the transmitter site, the receiver site or at both sites. Said transmission channel with a given bandwidth is then represented by N sub-carrier channels with a smaller bandwidth each, and said sub-carrier channels then characterize the transmission channel's propagation characteristics for the respective frequency range associated with each respective sub-carrier.

According to a method of the present invention, at least one signal, which is composed of a sequence of symbols, is transmitted over said transmission channel to obtain $M_R$ receive signals, and wherein each of said respective symbols is only affected by one respective sub-carrier channel of said N sub-carrier channels during said transmission. Said symbols may for instance be amplitude- and/or phase-shift keying symbols of a limited symbol alphabet and may be transmitted in bursts. Each of said at least one signals may be transmitted from one respective input of said $M_T$ inputs or may be projected onto several or all of said $M_T$ inputs of said transmission channel. Said at least one signal may have to be pre-processed prior to transmission to ensure that each symbol is only affected by one of said N sub-carrier channels. If said transformation domain is the frequency domain, said preprocessing may for instance be performed by interpreting the symbols of said at least one signal to be in the frequency domain and to perform an inverse Fourier transformation on said at least one signal prior to the transmission. Note that single symbols of signals that are associated in said transformation domain with one of said N sub-carrier channels will be understood as signal components throughout this specification.

According to a method of the present invention, said at least one signal is at least subject to an Inverse Fourier Transform (IFT) before being transmitted over said transmission channel, and wherein said $M_R$ receive signals are at least subject to a Fourier Transform (FT) after reception. Performing an IFT at the transmitter site and an FT at the receiver site allows to describe the transmission of said symbols of said at least one signal over said transmission channel by N decoupled frequency domain system models. This method of the present invention then implements an Orthogonal Frequency Division Multiplex (OFDM) (or multi-carrier) system, wherein each transmitted symbol uses only the bandwidth of one sub-carrier channel during its transmission.

According to a method of the present invention, at least one signal, which is composed of a sequence of symbols, is transmitted over said transmission channel to obtain $M_R$ receive signals, and wherein each of said symbols is affected by all of said N sub-carrier channels during said transmission. Said symbols may for instance be amplitude- and/or phase-shift keying symbols of a limited symbol alphabet and may be transmitted in bursts. This method of the present invention then may implement a single-carrier system, wherein each transmitted symbol uses the entire transmission bandwidth of the channel during its transmission. Note that the portion of said signals that is associated in said transformation domain with one of said N sub-carrier channels will also be denoted as signal component throughout this specification.

According to a method of the present invention, a cyclic prefix is added to said at least one signal before its transmission, and/or wherein a prefix is removed from said $M_R$ receive signals after their reception. Adding and removing prefixes prior to and/or after the transmission of signals may allow to transform a space-time MIMO channel matrix that describes said frequency-selective transmission channel with said $M_T$ inputs and said $M_R$ outputs and that may consist of Toeplitz matrices into a modified space-time MIMO channel matrix that consists of circulant matrices. This transformation of the space-time MIMO channel matrix may significantly simplify a provision of said representation of said transmission channel in said transformation domain.

According to a method of the present invention, said equalization filters are provided at a transmit site of said transmission channel and applied to said at least one signal before said at least one signal is transmitted over said transmission channel. This method of the present invention implements pre-equalization of the sub-carrier channels, for instance based on representations of said sub-carrier channels. In a system with $M_T=1$ and $M_R=1$, said pre-equalization may for instance attempt to force each of the N 1×1 sub-carrier channels to a constant value in order to remove inter-symbol interference caused by the frequency-selectivity of the transmission channel. In a system with $M_T>1$, the signal components that are to be transmitted over said sub-carrier channels may for instance be projected onto the respective $M_T$ inputs of said sub-carrier channels with transmit weight vectors that may for instance be chosen so that the signal components transmitted from the $M_T$ inputs to one or several of said $M_R$ outputs constructively interfere. In a system in which more than one signal is transmitted concurrently, said signal components may be jointly multiplied with a pre-equalization matrix (containing a respective set of weights for each of said at least one signals) that reduces the magnitude of the off-diagonal elements in a matrix that is yield by multiplying the matrix that represents the sub-carrier channel with said pre-equalization matrix. Said pre-equalization may be performed together with an FT/IFT and/or an addition of a prefix.

According to a method of the present invention, said equalization filters are provided at a receive site of said transmission channel and applied to said $M_R$ receive signals after said $M_R$ receive signals have been received. This method of the present invention implements post-equalization of the sub-carrier channels based on representations of said sub-carrier channels. In a system with $M_T=1$ and $M_R=1$, said pre-equalization may for instance attempt to force each of the N 1×1 sub-carrier channels to a constant value in order to remove inter-symbol interference caused by the frequency-selectivity of the transmission channel. In a system with N, the receive signal components received at the $M_R$ outputs of the sub-carrier channels may for instance be combined with receive weight vectors that may for instance be chosen so that the signal components received at the $M_R$ outputs of said sub-carrier channels constructively interfere. In a system in which more that one signal is transmitted concurrently, said receive signal components in each sub-carrier channel may be jointly multiplied with a post-equalization matrix (containing a set of receive weight vectors for each of said at least one signals) that reduces the magnitude of the off-diagonal elements in a matrix that is yield by multiplying said post-equalization matrix with the matrix that represents the sub-carrier channel. Said post-equalization may be performed together with an FT/IFT and/or a removal of a prefix.

According to a method of the present invention, said equalization filters are provided both at a transmit site and a receive site of said transmission channel and applied to said at least one signal before said at least one signal is transmitted over said transmission channel and to said $M_R$ receive signals after said $M_R$ receive signals have been received. This method of the present invention implements pre- and post-equalization of the sub-carrier channels based on representations of said sub-carrier channels. In a system with $M_R>1$ and $M_T>1$, the signal components that are to be transmitted over said sub-carrier channels may for instance be projected onto the respective $M_T$ inputs of said sub-carrier channels with transmit weight vectors, and the receive signal components received at the $M_R$ outputs of the sub-carrier channels may for instance be combined with receive weight vectors, wherein the transmit and receive weight vectors may be chosen so that the sub-carrier channels are spatially orthogonalized, i.e. that multiple access interference between concurrently transmitted signal components is removed or mitigated. Said pre- and post-equalization may be performed together with an FT/IFT and/or with an addition and a removal of a prefix, respectively.

According to a method of the present invention, said first-type equalization filter is at least partially designed to compensate for attenuations in at least one sub-carrier channel. For instance, in a system with $M_T=1$ and $M_R=1$, said equalization may for instance attempt to force each of the N 1×1 sub-carrier channels to a constant value, thus removing the intersymbol interference between symbols induced by the frequency-selectivity of the transmission channel.

According to a method of the present invention, an equalization filter defines a transmit weight vector for each of said at least one signals, wherein each of said transmit weight vectors projects components of said at least one signal at a respective orthogonal sub-carrier in said transformation domain onto the $M_T$ inputs of said respective sub-carrier channel, and wherein the components of said $M_R$ receive signals output by the $M_R$ outputs of said respective sub-carrier channels represent components of $M_R$ reconstructed signals. In this pre-equalization method, no further equalization at the receiver site may be required, so that said components of said receive signals may already represent components of reconstructed signals, wherein said $M_R$ reconstructed signals are estimates of $M_R$ signals transmitted over said transmission channel.

According to a method of the present invention, an equalization filter defines a receive weight vector for each of $M_T$ signals, and wherein each of said $M_T$ receive weight vectors combines components of said $M_R$ receive signals at a respective orthogonal sub-carrier in said transformation domain received at the $M_R$ outputs of said respective sub-carrier channels into components of one of $M_T$ reconstructed signals. In this post-equalization method, no further equalization at the transmitter site may be required, so that said components of said receive signals may already represent components of reconstructed signals, wherein said $M_T$ reconstructed signals are estimates of $M_T$ signals transmitted over said transmission channel.

According to a method of the present invention, an equalization filter defines a transmit weight vector for each of K signals, wherein each of said K transmit weight vectors projects components of one of said K signals at a respective orthogonal sub-carrier in said transformation domain onto the $M_T$ inputs of said respective sub-carrier channel; and a corresponding receive weight vector for each of said K signals, wherein each of said receive weight vectors combines components of said $M_R$ receive signals at a respective orthogonal sub-carrier in said transformation domain received at the $M_R$ outputs of said respective sub-carrier channels into components of one of K reconstructed signals. In this pre- and post-equalization method, said K reconstructed signals are estimates of K signals transmitted over said transmission channel.

According to a method of the present invention, said $M_R$ receive signals are subject to noise. Said noise may represent thermal noise and/or all types of interference, for instance interference between the transmitters in different cells of a communication system, or interference between transmitters of different communication systems.

According to a method of the present invention, said first-type equalization filter is chosen to increase the Signal-to-Noise Ratio of at least one of said reconstructed signals. The Signal-to-Noise Ratio may for instance relate the amount of power in said reconstructed signal that is due to a desired signal to the amount of noise power in said reconstructed signal. Therein, said desired signal is a signal transmitted over said transmission channel that is actually to be reconstructed. Said increase may refer to the Signal-to-Noise ratio of said reconstructed signals experienced without equalization.

According to a method of the present invention, said first-type equalization filter is chosen to increase the Signal-to-Interference Ratio of at least one of said reconstructed signals. The Signal-to-Interference Ratio may for instance relate the amount of power in said reconstructed signal that is due to a desired signal to the amount of power in said reconstructed signal that is due to undesired signals. Said increase may refer to the Signal-to-Interference Ratio of said reconstructed signals experienced without equalization.

According to a method of the present invention, said first-type equalization filter is chosen to increase the Signal-to-Noise-and-Interference Ratio of at least one of said reconstructed signals. The Signal-to-Noise-and-Interference Ratio may for instance relate the amount of power in said reconstructed signal that is due to a desired signal to the amount of power in said reconstructed signal that is due to undesired signals and the amount of noise power in said reconstructed signal. Said increase may refer to the Signal-to-Noise-and-Interference Ratio of said reconstructed signals experienced without equalization.

According to a method of the present invention, at least two first-type equalization filters associated with at least two respective signals are chosen to create at least two substantially orthogonal spatial transmission channels for a substantially orthogonal transmission of said at least two signals.

According to a method of the present invention, said representation of at least one sub-carrier channel in said at least one set of sub-carrier channels is an estimate of at least one sub-carrier channel of said at least one set of sub-carrier channels. Said estimates may for instance be obtained by blind, semi-blind or non-blind channel estimation techniques that use no training symbols at all, only a few training symbols for initialization and/or identification, and a plurality of training symbols, respectively. Channel estimation may be performed in the temporal and/or frequency domain. Channel estimation may typically be performed at the receiver site. The transmitter site may be furnished with said channel estimates via feedback or may use channel estimates from preceding operational modes wherein said transmitter acted as a receiver. Said representation may also be an average or any other combination of several sub-carrier channel estimates of one or several sets of sub-carrier channels.

According to a method of the present invention, said first-type equalization filter is determined from an eigenvalue decomposition of a spatial covariance matrix of at least a part of said representation of at least one sub-carrier channel. Said first-type equalization filter may for instance be the dominant eigenvector of the spatial covariance matrix of a part of said combined sub-carrier channel representation.

According to a method of the present invention, said first-type equalization filter is determined from a generalized eigenvalue decomposition based on a first spatial covariance matrix of a first part of said representation of at least one sub-carrier channel and a second spatial covariance matrix of a second part of said representation of at least one sub-carrier channel.

According to a method of the present invention, said first-type equalization filter is a Zero-Forcing filter.

According to a method of the present invention, said first-type equalization filter is a Minimum Mean Square Error filter.

According to a method of the present invention, a temporally and/or spatially white noise covariance matrix is assumed for the derivation of said first-type equalization filter. The noise added to said receive signals then is assumed to be temporally and/or spatially white and uncorrelated. Due to the simple diagonal structure of a white noise covariance matrix, the computation of the first-type equalization filter may be vastly simplified.

According to a method of the present invention, an estimate of a spatial and/or temporal noise covariance matrix is used for the derivation of said first-type equalization filter. Said estimate of said spatial and/or temporal noise covariance matrix may for instance be obtained during channel estimation or during periods in which no signals are transmitted and thus only noise is received.

According to a method of the present invention, said first-type equalization filter is at least partially determined from a singular value decomposition of said representation of at least one sub-carrier channel. For instance, functions of the right singular vectors then may be used as a part of the first-type equalization filter on the transmitter site, functions of the left singular vectors then may be used as a part of the first-type equalization filter on the receiver site, and functions of the singular values may be used as parts of first-type equalization filters at either the transmitter and/or receiver site.

According to a method of the present invention, said first-type equalization filter is at least partially determined from an eigenvalue decomposition of said representation of at least one sub-carrier channel. For instance, functions of the eigenvectors and eigenvalues obtained from said eigenvalue decomposition may be used as first-type equalization filter or parts thereof at the transmitter and/or receiver site.

According to a method of the present invention, said first-type equalization filter is at least partially determined from a Cholesky decomposition of said representation of at least one sub-carrier channel. For instance, functions of the lower triangular matrix obtained from said Cholesky decomposition may be used as first-type equalization filters or parts thereof at the transmitter and/or receiver site.

According to a method of the present invention, said first-type equalization filter is at least partially determined from a QR decomposition of said representation of said at least one sub-carrier channel. For instance, functions of the orthogonal matrix Q and/or the upper triangular matrix R obtained from said QR decomposition may be used as first-type equalization filters or parts thereof at the transmitter and/or receiver site.

According to a method of the present invention, said first-type equalization filter is based on a water-filling solution. Said water-filling solution may for instance attempt to distribute the available overall transmission power onto the spatially orthogonal channels offered by said transmission channel after equalization according to an optimization criterion.

According to a method of the present invention, said first-type equalization filters at least partially implement a power control mechanism.

According to a method of the present invention, a size $\tilde{B}$ of said at least one set of at least two sub-carrier channels depends on a coherence bandwidth of said frequency-selective transmission channel. If said transformation domain is the frequency domain, said transmission channel is represented by a set of orthogonal frequency sub-carriers the transmission characteristics of which are represented by the respective sub-carrier channels. The differences between sub-carrier channels of neighboring frequency sub-carriers depend on the channel coherence bandwidth of the space-time MIMO channel. For large channel coherence bandwidth, said differences will be negligible, and, in view of the computational complexity involved with the equalization of sub-carrier channels, it then may be advantageous to compute only one or a few first-type equalization filters per set of sub-carrier channels and to derive the remaining equalization filters for said set of sub-carrier channels from said computed first-type equalization filters. In the simplest case, only one, for instance a center first-type equalization filter, may be computed per set, and the remaining second-type equalization filters then may be equal to said center first-type equalization filter, or are gained from said center first-type equalization filters of two or more sets via inter- and/or extrapolation. To reduce the effect of sub-carrier channel estimation errors, it may be advantageous to base the determination of said center first-type equalization filters on a representation of sub-carrier channels that is an average over all sub-carrier channels of one or several sets of sub-carrier channels.

According to a method of the present invention, said size $\tilde{B}$ of said at least one set of at least two sub-carrier channels is adaptively controlled according to said coherence bandwidth of said frequency-selective transmission channel. With increasing coherence bandwidth, the size of said at least one set may be increased, so that less computations of first-type equalization filters are required. Said coherence bandwidth may for instance be adaptively estimated based on channel estimates with techniques that are well-known to a skilled person.

According to a method of the present invention, said coherence bandwidth is determined to correspond to B orthogonal sub-carrier separations, wherein said size $\tilde{B}$ of said at least one set of sub-carrier channels is determined as the largest integer that is smaller or equal to B and divides N, and wherein N/$\tilde{B}$ sets of adjacent sub-carrier channels are formed. Then the size of all formed sets of sub-carrier channels is equal.

According to a method of the present invention, said representation of at least one sub-carrier channel for each of said at least one sets of sub-carrier channels is determined by averaging over $\tilde{B}$ estimates or measurements of the $\tilde{B}$ sub-carrier channels contained in said respective set. This may average out channel estimation or measurement noise contained in said estimates or measurements and thus improves equalization performance.

According to a method of the present invention, $\tilde{B}$ is a power of 2. This choice may further contribute to reduce the computational complexity.

According to a method of the present invention, said first-type and second-type equalization filters are equal. The second-type equalization filters then may for instance simply be copied from said first-type equalization filters.

According to a method of the present invention, said first-type equalization filter is used for a sub-carrier channel in the center of said at least one set of sub-carriers. Said center may also comprise several sub-carrier channels.

According to a method of the present invention, said second-type equalization filter is derived at least partially from said first-type equalization filter via interpolation and/or extrapolation. For instance, interpolation and extrapolation techniques such as interpolation and extrapolation based on polynomials, rational functions, trigonometric functions, Fourier methods, splines or any other method might be applied.

According to a method of the present invention, at least said first-type equalization filter is at least partially fed back. Feeding back only said first-type equalization filter for each set of sub-carrier channels vastly reduces the amount of feedback information compared to systems in which equalization filters for each sub-carrier channel have to be fed back. The fed back first-type equalization filters then can for instance be used for the equalization of all sub-carriers of a set, or for the derivation of second-type equalization filters based on interpolation and/or extrapolation of said first-type equalization filters of different sets of sub-carrier channels.

According to a method of the present invention, said feedback is absolute. Then quantized or non-quantized information on said equalization filters may be fed back.

According to a method of the present invention, said feedback is differential. Then only differences between quantized or non-quantized information on said equalization filters may be fed back, which, in comparison to absolute feedback, may reduce the amount of feedback data.

According to a method of the present invention, at least two sets of sub-carrier channels are formed, and wherein for at least one of said at least two sets, no equalization filter is fed back, and wherein, instead, differential information on said equalization filter with respect to at least one equalization filter of at least one different set is fed back.

According to a method of the present invention, said feedback is quantified. Alternatively, said feed-back may be non-quantified.

According to a method of the present invention, said feedback uses Gray mapping. Alternatively, said feed-back may use a different mapping technique.

A computer program is further proposed with instructions operable to cause a processor to perform the above-mentioned method steps.

A computer program product is further proposed comprising a computer program with instructions operable to cause a processor to perform the above-mentioned method steps.

A device is further proposed for equalizing a frequency-selective transmission channel with $M_T$ inputs and $M_R$ outputs, wherein said transmission channel can be represented in a transformation domain based on N orthogonal sub-carriers, and wherein the transmission characteristics from said $M_T$ inputs to said $M_R$ outputs of said transmission channel for each of said N respective orthogonal sub-carriers in said transformation domain are represented by N respective sub-carrier channels, the device comprising means arranged for using equalization filters for at least two of said N sub-carrier channels, wherein at least one set of sub-carrier channels comprising at least two of said N sub-carrier channels is formed, wherein for at least one sub-carrier channel in said at least one set of sub-carrier channels, a first-type equalization filter is used that is determined based on a representation of at least one sub-carrier channel of said at least one set of sub-carrier channels, and wherein for at least one sub-carrier channel in said at least one set of sub-carrier channels, a second-type equalization filter is used that is derived at least partially from said first-type equalization filter.

A system is further proposed for equalizing a frequency-selective transmission channel with $M_T$ inputs and $M_R$ outputs, wherein said transmission channel can be represented in a transformation domain based on N orthogonal sub-carriers, and wherein the transmission characteristics from said $M_T$ inputs to said $M_R$ outputs of said transmission channel for each of said N respective orthogonal sub-carriers in said transformation domain are represented by N respective sub-carrier channels, the system comprising at least one transmitter, and at least one receiver, wherein said at least one transmitter and/or said at least one receiver comprise means arranged for using equalization filters for at least two of said N sub-carrier channels, wherein at least one set of sub-carrier channels comprising at least two of said N sub-carrier channels is formed, wherein for at least one sub-carrier channel in said at least one set of sub-carrier channels, a first-type equalization filter is used that is determined based on a representation of at least one sub-carrier channel of said at least one set of sub-carrier channels, and wherein for at least one sub-carrier channel in said at least one set of sub-carrier channels, a second-type equalization filter is used that is derived at least partially from said first-type equalization filter.

These and other aspects of the invention will be apparent from and elucidated with reference to the embodiments described hereinafter.

DETAILED DESCRIPTION OF THE INVENTION

Figure 1:
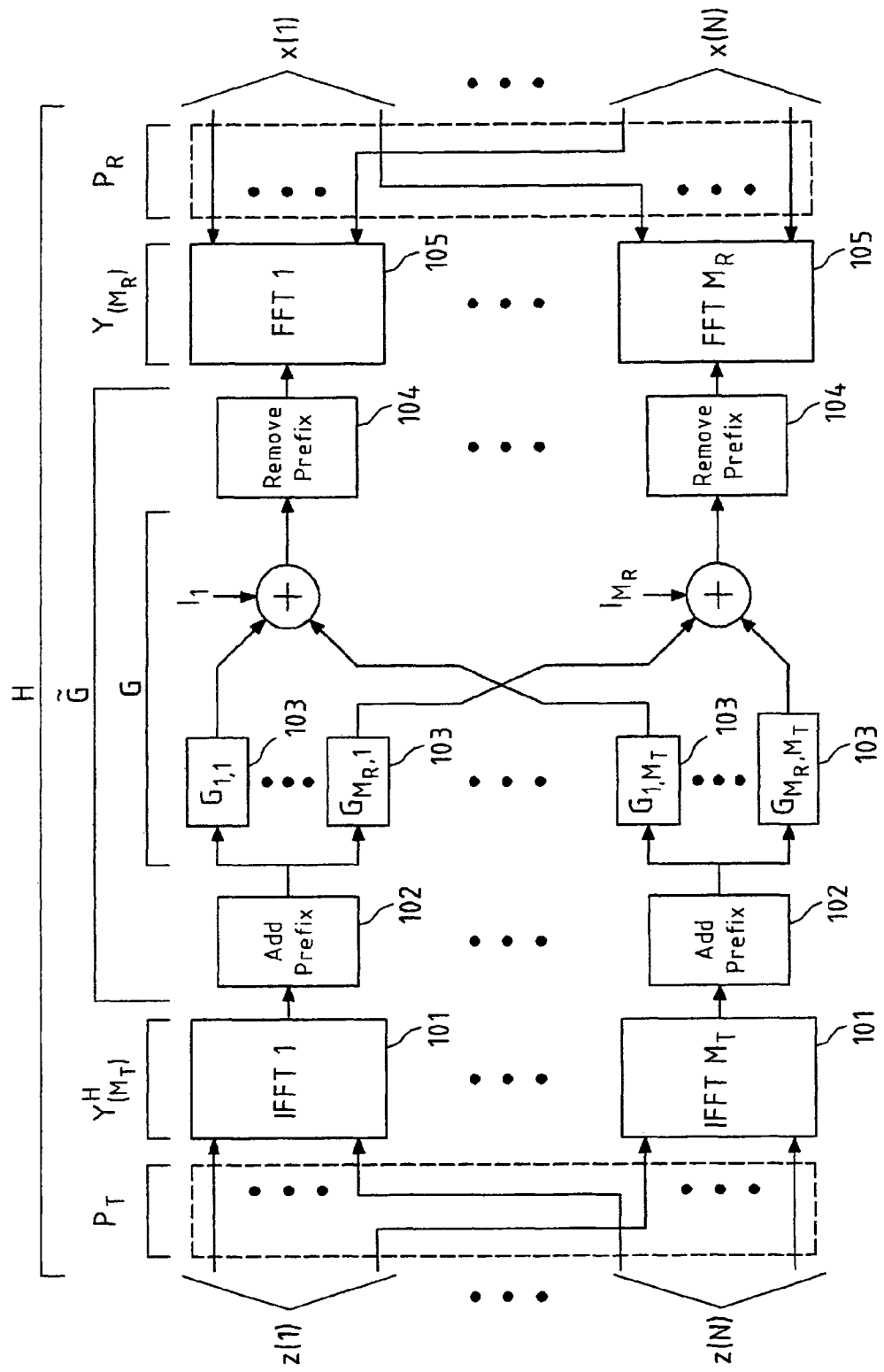
FIG. 1: a schematic representation of the transmitter and receiver processing required to convert a space-time system model into a space-frequency (multi-carrier) system model according to the prior art.
Figure 2:
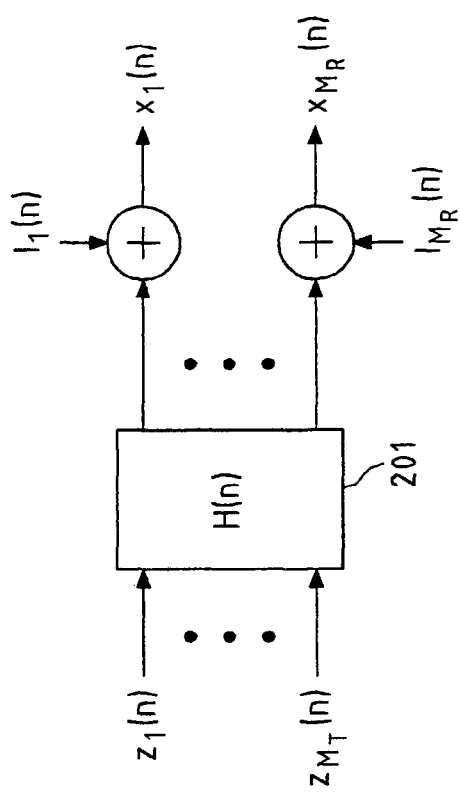
FIG. 2: a schematic representation of the transmission of single transmit signal symbols over a sub-carrier channel according to the prior art.
Figure 3:
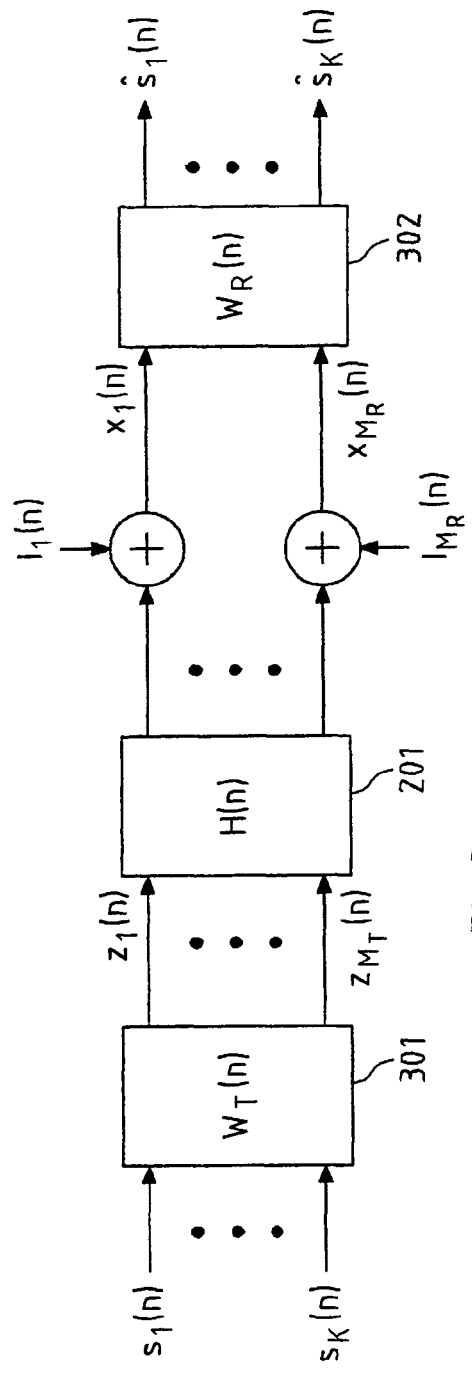
FIG. 3: a schematic representation of a pre- and/or post-equalization of a sub-carrier channel according to the prior art.

In prior art multi-carrier systems, a plurality of approaches to determine pre- and/or post-equalization filters $W_T(n)$ and $W_R(n)$ for the equalization of the N sub-carrier channels H(n) according to the set-up of FIG. 3 have been developed.

In the following sections of this specification, examples of choices for the pre- and/or post-equalization filters $W_T(n)$ and $W_R(n)$ will be presented. It is understood that these examples only serve for illustrative purposes and are not intended to limit the scope of the present invention, which is applicable to basically all pre- and/or post-equalization techniques for single- and multi-carrier systems. Furthermore, it is understood that the computation of said pre- and/or post-equalization filters may be based on estimates or measurements of said sub-carrier channels. For the sake of simplicity of presentation, in the following section, no further notation will be introduced to indicate that sub-carrier channels, on which the computation of equalization filters is based on, are estimated/measured sub-carrier channels or not.

Pre-Equalization

If pre-equalization is performed, the post-equalization matrix $W_R(n)$ may be chosen as $W_R(n)=E$, wherein E denotes the identity matrix with ones on the main diagonal and zeroes elsewhere. Then there basically may be no equalization at the receiver site, and the pre-equalization filters $W_T(n)$ for each sub-carrier index n=1, ..., N at the transmitter site may be chosen so that the receive symbols N directly represent the reconstructed symbols $\hat{s}_k(n)$. This requires (spatial) multiple access interference between the K signals that are transmitted over the transmission channel to be mitigated or removed.

A technique for the complete removal of multiple access interference is the application of Zero-Forcing (ZF) pre-equalization filters for each sub-carrier channel H(n), which are defined as the right pseudo-inverse of the respective sub-carrier channel H(n) (or its estimate or measurement), i.e.

$$W_T(n)=H^H(n)(H(n)H^H(n))^{-1}.$$

This technique may significantly increase the Signal-to-Interference Ratio (SIR) of the reconstructed symbols $\hat{s}_k(n)$.

A technique to increase the Signal-to-Noise Ratio (SNR) of the reconstructed symbols $\hat{s}_k(n)$, but without considering the mitigation of multiple access interference, is to use the dominant (i.e. the largest) eigenvector of the Spatial Covariance Matrix (SCM) of that part (the k-th row of the sub-carrier channel H(n)) of the sub-carrier channel H(n) that describes the transmission of a symbol $s_k(n)$ from the $M_T$ transmit antenna elements to the receive antenna element $m_R=k$, at which a reconstructed symbol $\hat{s}_k(n)=x_{m_R}(n)$ of said symbol $s_k(n)$ shall be received, for the mapping of said symbol $s_k(n)$ to the $M_T$ transmit antenna elements. Said SCM is then the outer vector product of the Hermitian of the k-th row of the sub-carrier channel H(n) and the k-th row of the sub-carrier channel H(n), and said dominant eigenvector of said SCM then forms the k-th column of the pre-equalization filter $W_T(n)$.

The respective k-th columns of the pre-equalization filter $W_T(n)$ can be understood as weight vectors that project the symbols $s_k(n)$ onto the $M_T$ transmit antenna elements, respectively, and attempt to spatially direct the transmission power towards the position of the corresponding receive antenna element $m_R=k$ where the reconstructed symbol $\hat{s}_k(n)=x_{m_R}(n)$ is to be received. In the case of K=1, i.e. when only one signal is to be transmitted over the transmission channel, said dominant eigenvector is simply the Hermitian of the first (and single) row of the sub-carrier channel matrix H(n).

This technique can be extended to mitigate multiple access interference (and thus to increase the SIR) by using the dominant (i.e. the largest) eigenvalue of a generalized EigenValue Decomposition (EVD) of the SCM related to the currently considered symbol $s_k(n)$ and of an SCM related to the remaining K−1 symbols $s_k(n)$ that are concurrently to be transmitted. This dominant eigenvector then forms the k-th column of the pre-equalization filter $W_T(n)$. Said SCM related to the currently considered symbol $S_k(n)$ is determined as in the previously described technique. Said SCM related to the remaining K−1 symbols $s_k(n)$ is determined by depriving the sub-carrier channel matrix H(n) of its k-th row and by forming the outer matrix product of the Hermitian of the deprived matrix and the deprived matrix itself. The k-th columns of the pre-equalization filter $W_T(n)$ can then be understood as weight vectors that project the symbols $s_k(n)$ onto the $M_T$ transmit antenna elements, respectively, and attempt to spatially direct the transmission power towards the position of the corresponding receive antenna element $m_R=k$ where the respective reconstructed symbol $x_{m_R}(n)=\hat{s}_k(n)$ is to be received and not towards the positions of the other K−1 receive antenna elements.

Further techniques for pre-equalization are known to a skilled person and thus will not be presented in this specification in detail.

Post-Equalization

If post-equalization is performed, the pre-equalization matrix $W_T(n)$ may be chosen as $W_T(n)=E$, wherein E denotes the identity matrix. Then there basically may be no equalization at the transmitter site, and the post-equalization filters $W_R(n)$ for each sub-carrier index n=1, ..., N at the receiver site may be chosen so that the reconstructed symbols $\hat{s}_k(n)$ resemble the transmit symbols $z_{m_T}(n)$ (which in turn equal the symbols $s_k(n)$). This requires (spatial) multiple access interference between the K signals that are transmitted over the transmission channel to be mitigated or removed.

A technique for the complete removal of multiple access interference is the application of a Zero-Forcing (ZF) post-equalization filter for each sub-carrier channel H(n) at the receiver site, which is defined as the left pseudo-inverse of the respective sub-carrier channel H(n) (or its estimate/measurement), i.e.

$$W_R(n)=(H^H(n)H(n))^{-1}H^H(n).$$

This technique may significantly increase the Signal-to-Interference Ratio (SIR) of the reconstructed symbols $\hat{s}_k(n)$. If information on the noise covariance matrix $$R_I(n)=E\{I(n)I^H(n)\},$$

wherein $E\{\cdot\}$ denotes the expectation operator, is available, this information can be included into the ZF post-equalization filter as:

$$W_R(n)=(H^H(n)R_1^{-1}(n)H(n))^{-1}H^H(n)R_1^{-1}(n).$$

The ZF post-equalization filter causes the noise contribution in the reconstructed symbols $\hat{s}_k(n)$ to be correlated. These correlation can be removed by extending the ZF filter by a Wiener filter to a Minimum Mean Square Error (MMSE) post-equalization filter, which is given as:

$$W_R(n)=(H^H(n)R_1^{-1}(n)H(n)+R_s^{-1}(n))^{-1}H^H(n)R_1^{-1}(n),$$

wherein $R_s(n)$ denotes the covariance matrix of the K symbols $s_k(n)$ that are to be transmitted over the respective sub-carrier channel H(n).

Both the ZF and MMSE post-equalization filters are suited for decision feed-back or iterative application, as for instance proposed by the Bell Laboratories Layered Space-Time Architecture (BLAST), wherein K post-equalization steps are performed. In the first step, multiple access interference of all K−1 symbols $s_k(n)$ caused in sub-carrier channel K is removed, and the reconstructed symbol $\hat{s}_k(n)$ with the largest Signal-to-Noise-and-Interference Ratio (SNIR) is accepted. In a second step, the influence of the accepted symbol $s_k(n)$ is removed from the received symbols, and post-equalization is repeated, but only with removal of multiple-access interference caused by the remaining K−2 symbols. Again the reconstructed symbol $\hat{s}_k(n)$ with the SNIR is accepted, and a third step of post-equalization is performed. The reduced number of symbols for which post-equalization of the sub-carrier channel has to be performed increases the degrees of freedom that are available in post-equalization and significantly increases the SNIR of each reconstructed symbol $\hat{s}_k(n)$.

It is understood that the above-mentioned pre-equalization techniques that are based on the dominant eigenvectors or dominant generalized eigenvectors of SCMs formed of the sub-carrier channel matrix H(n) are correspondingly applicable for post-equalization at the receiver site and thus do not need to be presented here again.

It should be also understood that further techniques for post-equalization are known to a skilled person and thus will not be presented in this specification in detail.

Pre- and Post-Equalization

If pre- and post-equalization is performed, the pre-equalization matrix $W_T(n)$ and the post-equalization matrix $W_R(n)$ may be chosen for each sub-carrier index n=1, . . . , N so that the reconstructed symbols $\hat{s}_k(n)$ resemble the symbols $s_k(n)$. This requires (spatial) multiple access interference between the K signals that are transmitted over the transmission channel to be mitigated or removed.

An exemplary choice for the pre- and post-equalization filters can be derived from a Singular Value Decomposition (SVD) of the sub-carrier channel matrix H(n):

$$H(n)=U(n)\Sigma(n)V^H(n).$$

When H(n) has rank at least K, K spatially orthogonal channels for the interference-free transmission of a respective symbol $s_k(n)$ can be established. A suitable choice for the pre-equalization matrix $W_T(n)$ may then be to equal the K first $M_R$-dimensional column vectors of V(n), and a choice for the post-equalization matrix $W_R(n)$ may then be to equal the Hermitian of a matrix formed from the K first $M_R$-dimensional column vectors of U(n). Information on the singular values contained in the diagonal matrix $\Sigma(n)$ may be further exploited for power control or for a water-filling approach that distributes the transmission power onto the K spatially orthogonal channels to increase the SNIR of the reconstructed symbols $\hat{s}_k(n)$ or to increase the channel capacity that is achievable with each sub-carrier channel H(n), as disclosed in detail in U.S. Pat. No. 6,144,711.

It is understood that further techniques for combined pre- and post-equalization are known to a skilled person and thus need not be presented in this specification in detail, for instance approaches based on a Cholesky decomposition or a QR-decomposition.

Figure 4:
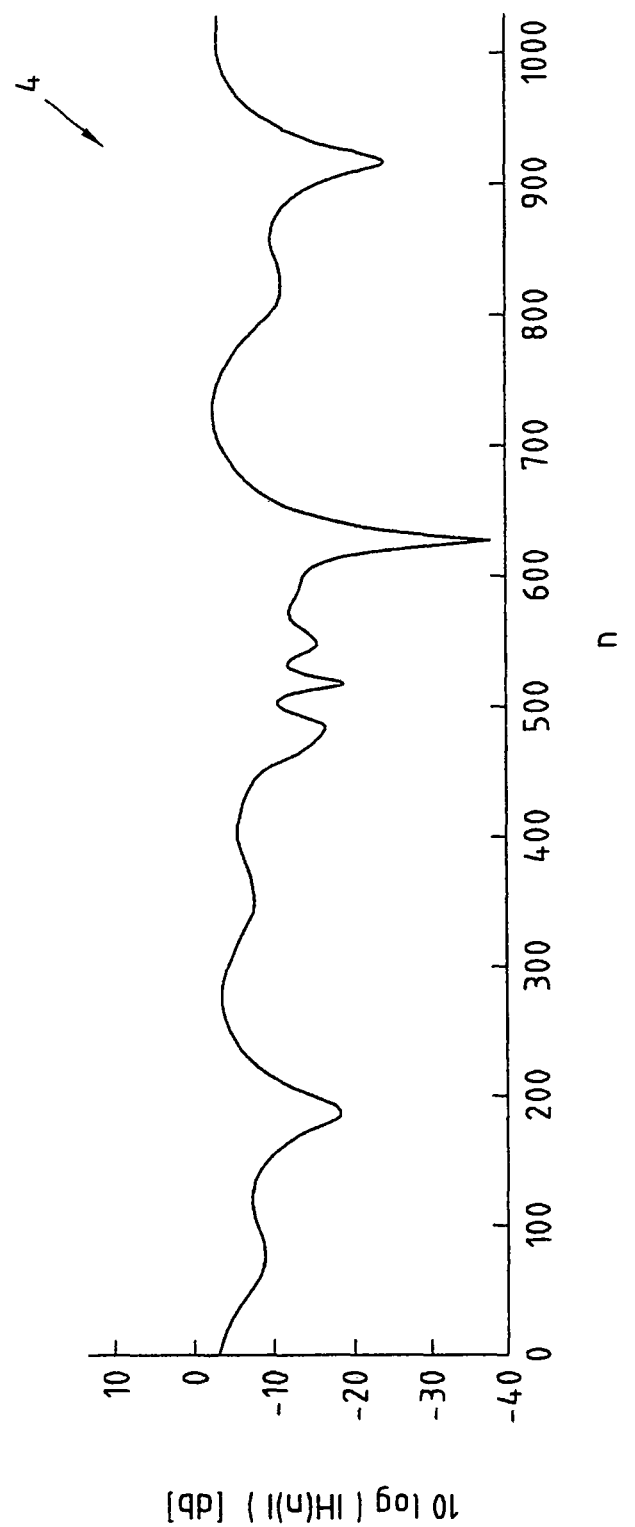
FIG. 4: an exemplary realization of the magnitude of a 1×1 sub-carrier channel H(n) as a function of the sub-carrier index n.

FIG. 4 exemplarily depicts the magnitude of a 1×1 sub-carrier channel matrix H(n) as a function of the sub-carrier index n=1, . . . , N, corresponding to a three-tap 1×1 space-time transmission channel G that was transformed by 1024-point FFTs and IFFTs, so that N=1024 sub-carriers were obtained. Due to the choice of the frequency domain as transfer domain, the plot of the magnitude of the 1×1 sub-carrier channel matrix H(n), or equally well the plot of the magnitude of any entry in a $M_R \times M_T$ sub-carrier channel matrix H(n) as a function of the sub-carrier index n=1, . . . , N represents the frequency domain channel transfer function of the respective time domain transmission channel from a single transmit antenna element $m_T$ to a single receive antenna element $m_R$ and thus gives a first impression of the channel coherence time of said respective transmission channels.

It is thus readily seen from FIG. 4 that the space-time transmission channel G is frequency-selective, because the magnitude of the 1×1 sub-carrier channel matrix H(n) is not the same for all sub-carrier indices n. It is thus not possible to use one equalization filter (at the transmitter and/or receiver site), as proposed by U.S. Pat. No. 6,144,711. However, to save computational costs, the present invention proposes to form sets of sub-carrier channels. It is then for instance possible to compute only one first-type equalization filter per set of sub-carrier channels based on information on the sub-carrier channels, for instance via left or right pseudo-inverses, via EVDs of SCMs or via SVDs, and to derive the remaining equalization filters as second-type equalization filters based on said first-type equalization filters, for instance via a less computationally expensive method such as using exactly the first-type equalization filters or performing interpolation of first-type equalization filters. From the exemplary plot of FIG. 4, it is readily seen that sets in the order of ten sub-carrier channels do not suffer from large changes of the magnitude of the sub-carrier channel H(n) and thus lend themselves for the reduced-complexity approach proposed by the present invention.

Figure 5:
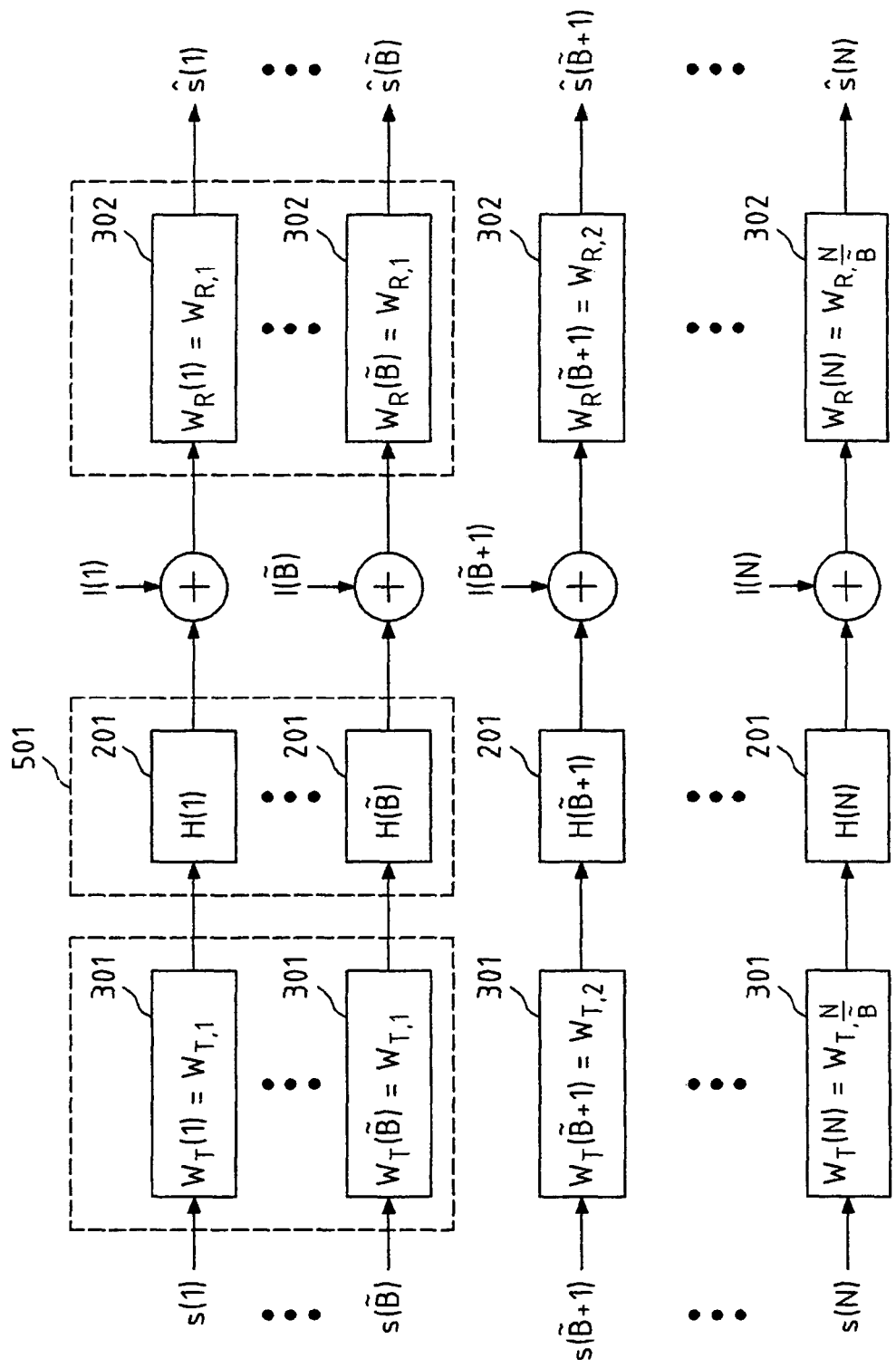
FIG. 5: a schematic representation of a pre- and/or post-equalization of sub-carrier channels based on the formation of sets of sub-carrier channels and the computation of only one equalization filer per set according to the present invention.

FIG. 5 schematically depicts a first embodiment of the present invention. In particular, FIG. 5 depicts the pre- and/or post-equalization of N decoupled sub-carrier channels H(n) 201 with corresponding pre-equalization filters $W_T(n)$ 301 and post-equalization filters $W_R(n)$ 302. It is readily understood that the cases in which only pre-equalization or only post-equalization is performed are included in this schematic representation as well, for instance, by appropriately setting the post- or pre-equalization filters equal to an identity matrix, respectively. The pre- and/or post-equalization allows for a reconstruction of the symbols $s_k(n)$ transmitted over each sub-carrier channel H(n), yielding reconstructed symbols $\hat{s}_k(n)$.

In FIG. 5, the formation of a set 501 of sub-carrier channels H(n) 201 comprising $\tilde{B}$ sub-carrier channels is depicted in dashed lines. The size $\tilde{B}$ of said set 501 may for instance be deduced from an estimation or measurement of the channel coherence time of the space-time MIMO channel, wherein said estimation or measurement may take place in the time or frequency domain, or both, and at the transmitter site or receiver site, or both. In the example of FIG. 5, the channel coherence time is expressed in $\tilde{B}$ sub-carrier separations, and then the largest integer B is determined that divides the number of sub-carriers N and is smaller than or equal to B. Then there exist N/$\tilde{B}$ sets of sub-carrier channels with $\tilde{B}$ sub-carrier channels each. However, it is equally well possible that sets of sub-carrier channels with different sizes are used instead.

In FIG. 5, it is also illustrated that for all pre- and/or post equalization filters in this set 501 of sub-carrier channels, the same pre- and/or post-equalization filters $W_{T,b}$ and/or $W_{R,b}$ with b=1, . . . , N/$\tilde{B}$ are used. Thus within a set 501, a first-type equalization filter $W_{T,b}$ and/or $W_{R,b}$ is determined, for instance for the equalization of the first or a center sub-carrier channel in said set 501 of sub-carrier channels, and then second-type equalization filters for the equalization of the remaining $\tilde{B}$−1 sub-carrier channels in this set 501 are derived from said first-type equalization filter. In the example of FIG. 5, this derivation is the simplest derivation possible, namely the identity of the first-type and second-type equalization filters. Said first-type equalization filter $W_{T,b}$ and/or $W_{R,b}$ may for instance be determined by one of the techniques described above, for instance as a ZF or MMSE filter, or via EVDs of SCMs, or via an SVD. Said calculation of said first-type equalization filter may be solely based on only one specific sub-carrier channel of said set 501 of sub-carrier channels, for instance a first or a center sub-carrier channel, or may be based on a combination of several or all sub-carrier channels in said set 501 of sub-carrier channels. For instance, it may be advantageous to determine an averaged sub-carrier channel by averaging over all sub-carrier channels in said set 501 of sub-carrier channels, and then to base the calculation of the first-type equalization filter on this averaged sub-carrier channel. This has the particular advantage that, when the calculation is based on estimates or measurements of said sub-carrier channels, estimation or measurement noise contained in said estimates or measurements may be averaged out, because the correlations between adjacent sub-carrier channels may be larger than the correlations of the estimation or measurement noise. However, a slightly increased computational complexity may be encountered as compared to the case where the determination of the first-type equalization filter is based on a single sub-carrier channel only due to the fact that the averaging operation has to be performed. In the embodiment of FIG. 5, it is assumed that the first-type equalization filters $W_{T,b}$ and/or $W_{R,b}$ are derived from such an averaged sub-carrier channel, and that the second-type equalization filters equal said first-type equalization filters. Then, instead of having to calculate equalization filters for each sub-carrier channel separately, for instance as a ZF filter with a computationally expensive inversion per sub-carrier channel, this ZF filter is only calculated once per set 501 of sub-carrier channels, so that the computational complexity is effectively reduced by a factor $s_k(n)$ (when neglecting the overhead for computing an averaged sub-carrier channel).

Depending on the coherence bandwidth of the frequency-selective transmission channel and on the size $\tilde{B}$ of the set 501 of sub-carrier channels, equalization performance may degrade when the second-type equalization filters are derived from said first type equalization filters by simply copying them. To allow for even larger sizes $\tilde{B}$ of said sets 501 of sub-carrier channels, said second-type equalization filters may be derived from said first-type equalization filters via interpolation and/or extrapolation. This is exemplarily depicted in FIG. 6.

Figure 6:
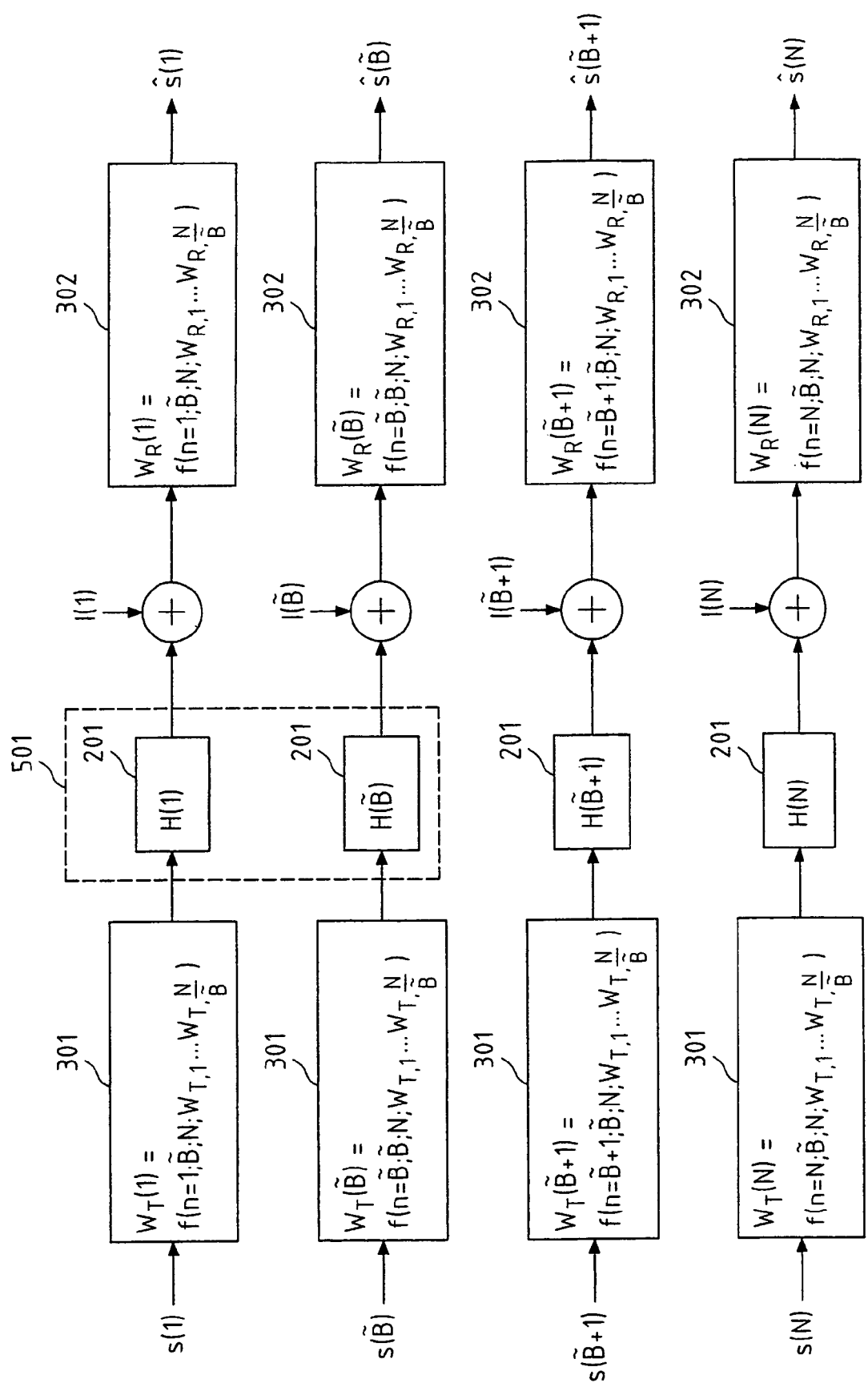
FIG. 6: a schematic representation of a pre- and/or post-equalization of sub-carrier channels based on the formation of sets of sub-carrier channels, on the determination of one first-type equalization filer per set based on representations of sub-carrier channels and on the derivation of second-type equalization filters via interpolation and/or extrapolation from the first-type equalization vectors according to the present invention.

In a second embodiment of the present invention according to FIG. 6, a set 501 of sub-carrier channels 201 is formed as in FIG. 5, and for said set of sub-carrier channels, a first-type equalization filter is determined based on either a single (e.g., a first or center) or an averaged sub-carrier channel (e.g. averaged over all sub-carrier channels of a set 501 of sub-carrier channels).

As in the embodiment of FIG. 5, K−1 sets 501 of $\tilde{B}$ sub-carrier channels each with one respective determined first-type equalization filter $W_{T,b}$ and/or $W_{R,b}$ with b=1, . . . , N/$\tilde{B}$ are formed. However, the second-type equalization filters in each of said sets 501 are not derived as identical equalization filters from said respective first-type equalization filters, but are obtained via interpolation and/or extrapolation, as is indicated by the notation $$W_{T,b} = f\left(n; \tilde{B}; N; W_{T,1}, \ldots, W_{T,\frac{N}{\tilde{B}}}\right)$$

(for $W_{R,b}$ correspondingly), i.e. each equalization filter is a function of the sub-carrier index n, the size $\tilde{B}$ of the set 501, the number of sub-carriers N, and the determined first-type equalization filters. It should be noted that the interpolation does not necessarily have to depend on all the parameters of said function. For instance, if the first-type equalization filters are determined from averaged sub-carrier channels and assumed to be best suited for the center sub-carriers of each set 501 of sub-carrier channels, second-type equalization filters for the sub-carrier channels located between the center sub-carrier channels of two adjacent sets 501 of sub-carrier channels may be determined as weighted summation of the first-type equalization filters of the first set and the second set only, weighted with a factor that considers the distance of said sub-carrier channel to said center sub-carrier channel of said first and second set and thus depending only on the size $\tilde{B}$ of a set and on the sub-carrier index n of the sub-carrier channel for which said second-type equalization filter is to be computed for. However, more complex interpolation and extrapolation techniques such as interpolation and extrapolation based on polynomials, rational functions, trigonometric functions, Fourier methods, splines or any other method might be applied as well.

With the inter- and extrapolation techniques allowing a better match of the second-type equalization filters to the sub-carrier channels they are used for, the size $\tilde{B}$ of the sets 501 thus may be further increased, and thus the number of computationally expensive determinations of first-type equalization filters based on matrix inversions, SVD or EVDs may be further reduced.

The first and second embodiments of the present invention as presented in FIGS. 5 and 6 relate to multi-carrier (e.g. OFDM) systems that perform an IFT at the transmitter site of the transmission channel and an FT at the receiver site of the transmission channel in order to ensure that the symbols that are to be transmitted over the frequency-selective space-time MIMO channel are only associated with one respective sub-carrier channel H(n), which is frequency-flat and thus computationally efficient to equalize. However, the present invention is also suited for single carrier systems, where no Fourier transformations and inverse Fourier transformations are performed at the transmitter and receiver site, so that the symbols transmitted over the frequency-selective MIMO channel are not associated with single frequency sub-carriers of the entire transmission channel bandwidth, but with the entire transmission channel bandwidth, i.e. with all sub-carrier channels. Equalization in single-carrier system is only possible by using the equalization filters that were already presented for the equalization of the sub-carrier channels H(n) on the space-time MIMO matrix G. As already stated in the opening part of this specification, this requires a generally unfeasible computational complexity of the order of $(NM_T)^3$ complex multiplications. However, instead of the unfeasible equalization of the space-time MIMO matrix G in the time domain, a feasible frequency domain equalization of G becomes possible when exploiting the structure of G in a similar fashion as it is exploited in multi-carrier systems. Furthermore, the computational complexity of this frequency domain equalization can be further reduced by applying the method of the present invention.

Figure 7:
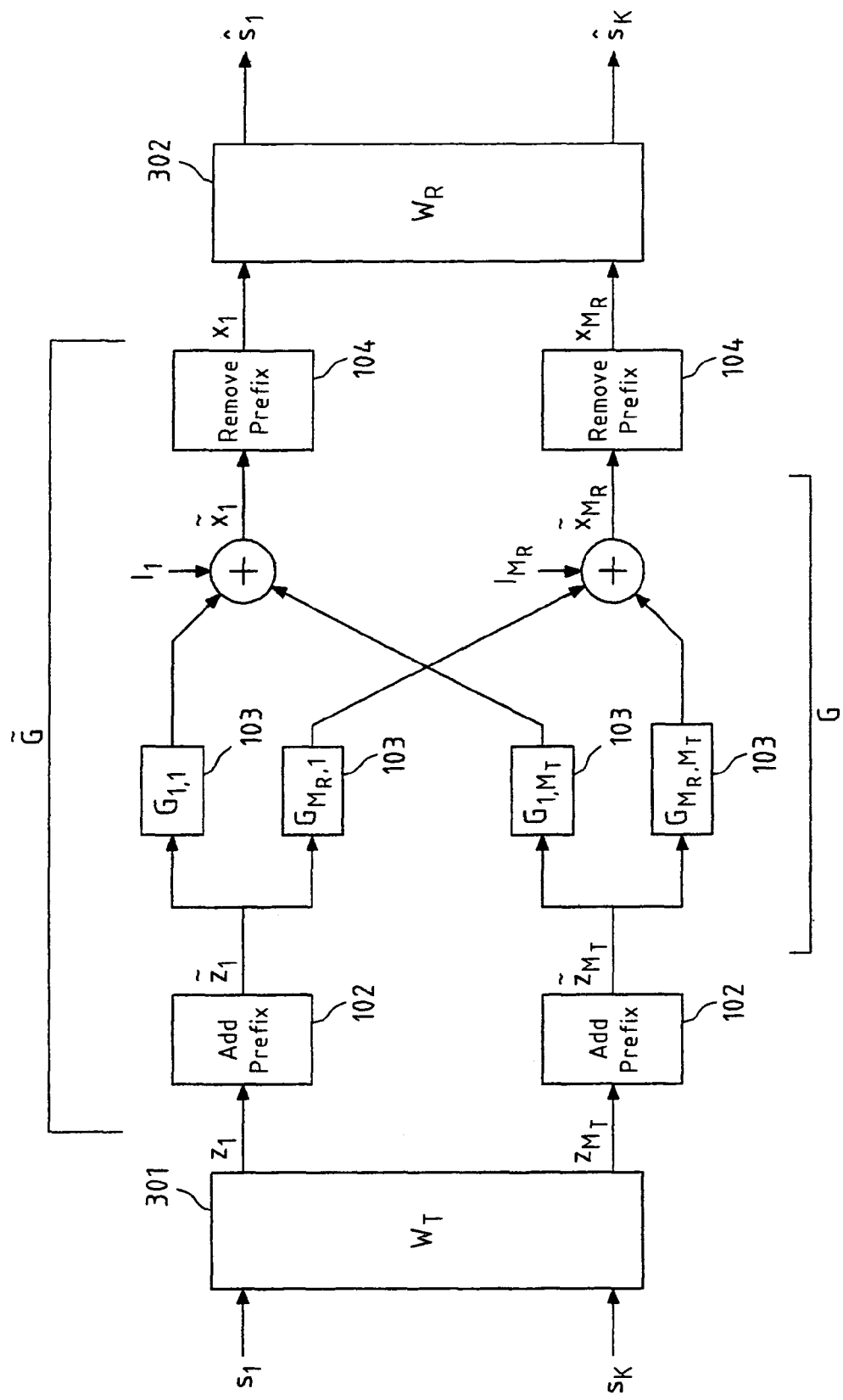
FIG. 7: a schematic representation of a pre- and/or post-equalization of a transmission channel in a single-carrier system according to the present invention.

FIG. 7 schematically depicts pre- and/or post-equalization of the space-time MIMO channel G(k), wherein the transmission of signals over this MIMO channel is basically described by the space-time system model of equation (1). To allow for a description of the space-time MIMO channel matrix G(k) as a modified space-time MIMO channel matrix $\tilde{G}(k)$ that is composed of circulant blocks $\tilde{G}_{m_R,m_T}(k)$ (instances 103), a cyclic prefix of length v may.
be added (instance 102) to the signals contained in the transmit signal vector z(k) to obtain a modified transmit signal vector $$\tilde{z}(k)=[z_1(N-v+1)\ldots z_1(N)z_1(1)\ldots z_1(N)\ldots z_{M_T}(N-v+1)\ldots z_{M_T}(N)z_{M_T}(1)\ldots z_{M_T}(N)]^T$$

and similarly, a prefix of length v has to be removed (instance 104) from the signals contained in the receive signal vector x(k) to obtain the modified receive signal vector $$\tilde{x}(k)=[x_1(v+1)\ldots x_1(N+v)\ldots x_{M_R}(v+11)\ldots x_{M_R}(N+v)]^T.$$

It may also be possible to force the transmission to be approximately circulant by using decision feedback etc, or by accepting the degradation from lost circularity at the edges of the N-element signal. This may, for instance, be a viable frequency domain equalization method.

The mapping of the transmit signal vector z(k) to the receive signal vector x(k) can then be described by the modified space-time MIMO channel matrix $\tilde{G}(k)$ that is composed of circulant blocks $\tilde{G}_{m_R,m_T}(k)$.

If a prefix is not added and removed, the modified space-time MIMO channel matrix $\tilde{G}(k)$ would be composed of only approximately circulant blocks $\tilde{G}_{m_R,m_T}(k)$. Then the N-element signal suffers from inter-symbol-interference from preceding and subsequent N-element signals. Processing may proceed as if the channel matrix would be composed of circulant blocks, with performance degradation arising from the inter-symbol-interference. This degradation may be mitigated with e.g. decision feedback, which may partially restore circularity.

As indicated in FIG. 7, a pre-equalization filter $W_T(k)$ 301 can now be used to jointly map K N-element signals $$s_{k'}(k) = [s_{k'}(1) \ldots s_{k'}(N)]^T$$

with k'=1, ..., K onto the transmit signal vector z(k). Similarly, a post-equalization filter $W_R(k)$ can be used to map the receive signal vector x(k) onto K reconstructed signals $$\hat{s}_{k'}(k) = [\hat{s}_{k'}(1) \ldots \hat{s}_{k'}(N)]^T$$

with k'=1, ..., K, wherein said reconstructed signals $\hat{s}_{k'}(k)$ then resemble said signals $\hat{s}_{k'}(k)$.

However, instead of calculating the pre- and/or post-equalization filters $W_T(k)$ 301 and $W_R(k)$ 302 in the time domain, a frequency domain calculation is used based on the decomposition of the space-time MIMO channel $\tilde{G}(k)$ into a block-diagonal space-frequency MIMO channel matrix H as in equation (8). Exploiting that the Fourier matrices and permutation matrices are unitary (the Hermitian equals the inverse), $\tilde{G}(k)$ can be expressed as:

$$\tilde{G}(k) = Y_{(M_R)}^H P_R^H H P_T^H Y_{(M_T)}. \quad (10)$$

This expression can now be used to replace the space-time MIMO channel matrix $\tilde{G}(k)$ in the definition of each time domain pre- and/or post-equalization filter that is based on $G(k)$ or $\tilde{G}(k)$. For instance, if post-equalization based on a ZF is desired, in the time domain the post-equalization filter $$W_R(k) = (\tilde{G}^H(k)\tilde{G}(k))^{-1} \tilde{G}^H(k)$$

would have to be computed, which involves the computation of a matrix inverse of size $NM_T \times NM_T$. Expressing this post-equalization with the help of equation (10) yields $$W_R(k) = Y_{(M_T)}^H P_T (H^H H)^{-1} H^H P_R Y_{(M_R)}, \quad (11)$$

which, due to the block-diagonal structure of the matrix H, only involves N computations of a matrix inverse of size $M_T \times M_T$.

Applying this post-equalization filter $W_R(k)$ on the receive signal vector x(k) to post-equalize the space-time MIMO channel $\tilde{G}(k)$ corresponds to performing a Fourier transformation on the receive signal vector (matrix $Y_{M_R}$)) and then permuting the results (matrix $P_R$). The signals obtained by these operations can be considered to be in the frequency domain, where now a ZF equalization of each sub-carrier channel H(n) is performed (matrix $(H^H H)^{-1} H^H$, wherein H contains the sub-carrier channels $M_T \ge 1$ on its main diagonal). Finally, the equalized signals are permuted again (matrix $P_T$); and then transformed back to the time domain via an inverse Fourier transformation (matrix $W_R(k)$).

This example of a ZF post-equalization in the frequency domain reveals that basically any of the pre- and/or post-equalization techniques that were presented above for a multi-carrier system can equally well be applied in a single-carrier system, if the signals that are to be pre- and/or post-equalized are transformed into the frequency domain, equalized therein and then transformed back to the time domain. These steps have to be performed at both the transmitter site and the receiver site of the space-time MIMO channel.

With the actual equalization being based on the sub-carrier channels H(n) regardless whether equalization is performed in a single-carrier or multi-carrier system, also the reduced complexity equalization approach of the present invention can be applied in both types of systems. For instance, subsets of sub-carrier channels may equally well be formed when equalizing the sub-carrier channels H(n) in the ZF post-equalization filter $W_R(k)$ of equation (11).

Figure 8:
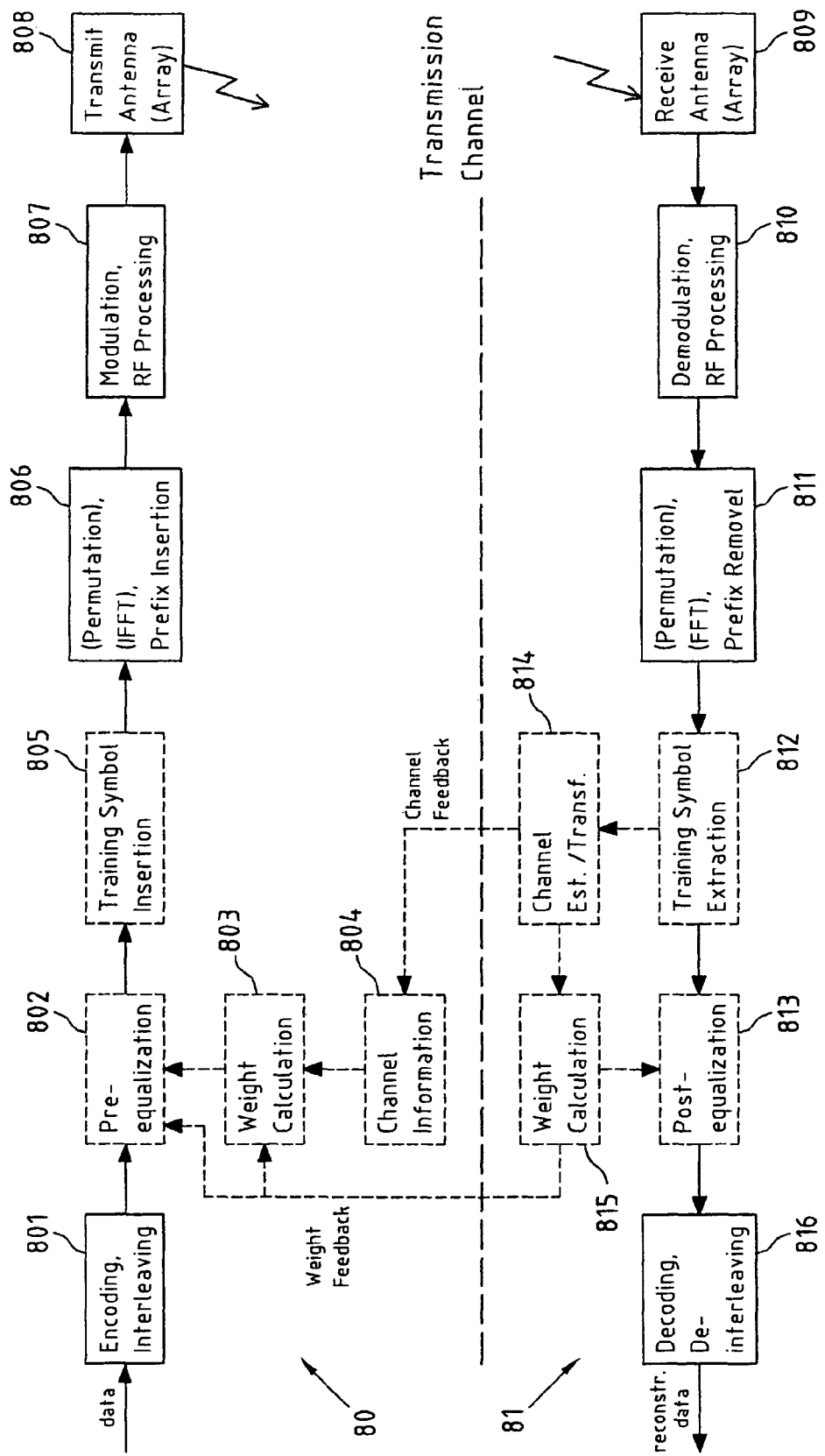
FIG. 8: a schematic representation of a single- or multi-carrier system for pre- and/or post-equalization of a transmission channel according to the present invention.

FIG. 8 schematically depicts the components of a single- or multi-carrier system for pre- and/or post-equalization of a transmission channel according to the present invention. The system comprises a transmitter 80 and a receiver 81. Optional components of said system are given in dashed lines.

In said transmitter 80, data from one or several data sources is encoded, for instance by source coding to reduce redundancy and/or by channel coding to add redundancy, and then interleaved to reduce the impact of burst errors during the transmission of said data over a transmission channel. These operations are performed by an encoder and interleaver element or instance 801, which may also distribute the encoded and interleaved data into transmission bursts that may be transmitted in time slots. The encoded and interleaved data then is optionally pre-equalized in a pre-equalization element or instance 802. In a single-carrier system, this pre-equalization may involve transfer of the data into the frequency domain, pre-equalization in the frequency domain, and then transformation of the pre-equalized data back to the time domain. In a multi-carrier system, said data is already interpreted to be in the frequency domain, thus no explicit transformation is required within the pre-equalization element or instance 802. The pre-equalization is based on equalization weights, that may also be considered as equalization filters or equalization matrices. These weights are either provided by a weight calculation element or instance 803, or directly fed back from the receiver 81 to the transmitter 81. If said equalization weights are calculated by said weight calculation element or instance 803, this calculation may be based on information on the transmission channel, which is provided by a channel information element or instance 804. This channel information element or instance 804 may receive such channel information via feedback from said receiver 81, or may have stored channel information that has been estimated, measured or otherwise acquired by said transmitter 80. After said optional step of pre-equalization, optionally training symbols are inserted into the possibly pre-equalized signals in a training symbol insertion element or instance 805. These training symbols allow for a channel estimation at the receiver 81. Said training symbols may be inserted into said possibly pre-equalized signals in the time or frequency domain. Equally well, said training symbols may be inserted into said encoded and interleaved data prior to said optional pre-equalization. In a single-carrier system, the signals as output by element or instance 805 are then optionally furnished with a prefix to allow for the modeling of the transmission based on a space-time MIMO system matrix that is composed of circulant blocks.

In a multi-carrier system, a permutation of the signals as output by the element or instance 805 is performed, then the resulting signals are inverse Fourier transformed, and then optionally a cyclic prefix is prepended to said signals. However, a non-OFDM type multicarrier systems, e.g. filter banks, may also be possible.

These operations are performed by an element or instance 806, and the signals output by this element or instance 806, which are considered to be discrete base-band signals, are then D/A converted and modulated to be transmitted at a carrier frequency by an element or instance 807. The modulated RF signals output by the element or instance 807 then are radiated via a transmit antenna array 808.

The RF signals then are propagated over a frequency-selective transmission channel and are received at a receive antenna array 809 of the receiver 81.

At the receiver 81, the received signals are subject to RF processing and demodulation in an element or instance 810 to transform the received signals back into time-discrete base-band signals. This may also comprise time and frequency synchronization. In a single-carrier system, the time-discrete base-band signals output by element or instance 810 then are deprived of a prefix to allow for the modeling of the transmission based on a space-time MIMO system matrix that is composed of circulant blocks. In a multi-carrier system, the signals as output by element or instance 810 are first deprived of a prefix, then Fourier transformed and subsequently permuted. These operations are performed in an element or instance 811. If training symbols were added in the element or instance 805 of the transmitter 80, the components of the received signals that are due to these training symbols are removed in an optional element or instance 812. Said removed training symbols then may be used to at least partially estimate the transmission channel in an optional channel estimation element or instance 814. Estimated channel information may then be fed-back to a channel information element or instance 804 of said transmitter 80 (the feedback link between element or instance 814 of receiver 80 and element or instance 804 of transmitter 81 is to be understood as logical link here, because actual feed-back information has to be transmitted over the transmission channel). Said channel estimation may be performed in the time domain or in the frequency domain, and, correspondingly, time domain or frequency domain channel information may be fed back. The channel information that is fed back does not necessarily have to be the complete estimated channel information, but may also only be a part thereof. Various methods for feedback are possible. It may, for instance, be possible to choose $\tilde{B}$ from a predefined set of possible values. The simplest choice may be an on-off choice. Either pre-equalization may be done with a given $\tilde{B}$, or pre-equalization may not be used at all. In this case, an open-loop transmission may be chosen, when the coherence bandwidth is smaller than the minimum $\tilde{B}$ acceptable. There may, as well be alternatives of choosing $\tilde{B}$ for all subcarriers from a set of alternatives, for instance 8, 16, 32 . . . , depending on B. Finally, there may be the possibility of choosing a set of different values $\tilde{B}_k$ from a predefined set, for instance $$\sum_k \tilde{B}_k = N.$$

This might require a longer $\tilde{B}_k$ sets of subcarriers, for which the channel changes slowly in frequency, and smaller $\tilde{B}_k$ for sets of subcarrier, where fast changes occur. These choices may have to be fed back. The feed-back may be either absolute or differential (in frequency). For instance, if estimated sub-carrier channels H(n) are fed back, only the differences between neighboring sub-carrier channels H(n) and not the full channel information itself may be fed-back. However, the feeding back of at least some sub-carrier channels H(n) in absolute form may still be required. Said feed-back may be absolute or differential. For said feed-back, for instance a Grey mapping or a non-Grey mapping may be used. Said estimated channel information then may be input into an optional weight calculation instance 815, wherein equalization weights (equalization filters or equalization matrices) are determined, for instance according to the techniques described in this specification. These equalization weights might be fed back via a logical link to the transmitter weight calculation element or instance 803 or directly to the optional pre-equalization element or instance 802 of the transmitter. For instance, if only first-type equalization weights are fed back to the transmitter 80, these first-type equalization weights may have to be fed back to the weight calculation element or instance 803, so that, at least partially based on these first-type equalization weights, second-type equalization weights may be derived.

Within the receiver 81, the equalization weights as output by the weight calculation element or instance 815 then are input into an optional post-equalization element or instance 813, which may post-equalize the transmission channel by processing the receive signals. In a single-carrier system, the receive signals are first transformed to the frequency domain, where reduced complexity equalization of the sub-carrier channels is performed under exploitation of the present invention, and then are transformed back to the time domain. In a multi-carrier system, the receive signals are interpreted to be in the frequency domain, thus reduced-complexity equalization according to the present invention can directly take place. The possibly post-equalized signals output by the optional post-equalization element or instance 813 then are input into a de-interleaving and decoding element or instance 816 which reverses the encoding and interleaving of element or instance 801 in the transmitter 80 in order to obtain a reconstruction of the data. The elements or instances 802, 803, 815, 813 can be viewed as various means arranged in a transmitter or receiver or both for using equalization filters 301, 302 for at least two of said N sub-carrier channels, wherein at least one set 501 of sub-carrier channels comprising at least two of said N sub-carrier channels is formed, wherein for at least one sub-carrier channel in said at least one set of sub-carrier channels, a first-type equalization filter is used that is determined based on a representation of at least one sub-carrier channel of said at least one set of sub-carrier channels, and wherein for at least one sub-carrier channel in said at least one set of sub-carrier channels, a second-type equalization filter is used that is derived at least partially from said first-type equalization filter.

In the system of FIG. 8, pre-equalization at the transmitter 80 may not be required when post-equalization is performed at the receiver 81, and then also no feedback may be necessary. If pre-equalization is performed at the transmitter 80, no post-equalization may be required at the receiver 81. It then may however still be necessary to perform channel estimation at the receiver 80 and to feed back the estimated channels or calculated weights to the transmitter 80. However, if the system operates in a time division duplex system, wherein the transmitters and receivers periodically change roles, the transmitter 80 may use channel information from preceding periods in which it acted as receiver and was able to estimate and store the transmission channel, so that no feedback is required. In frequency division duplex systems, however, some kind of channel or weight information feedback may be advantageous.

Figure 9:
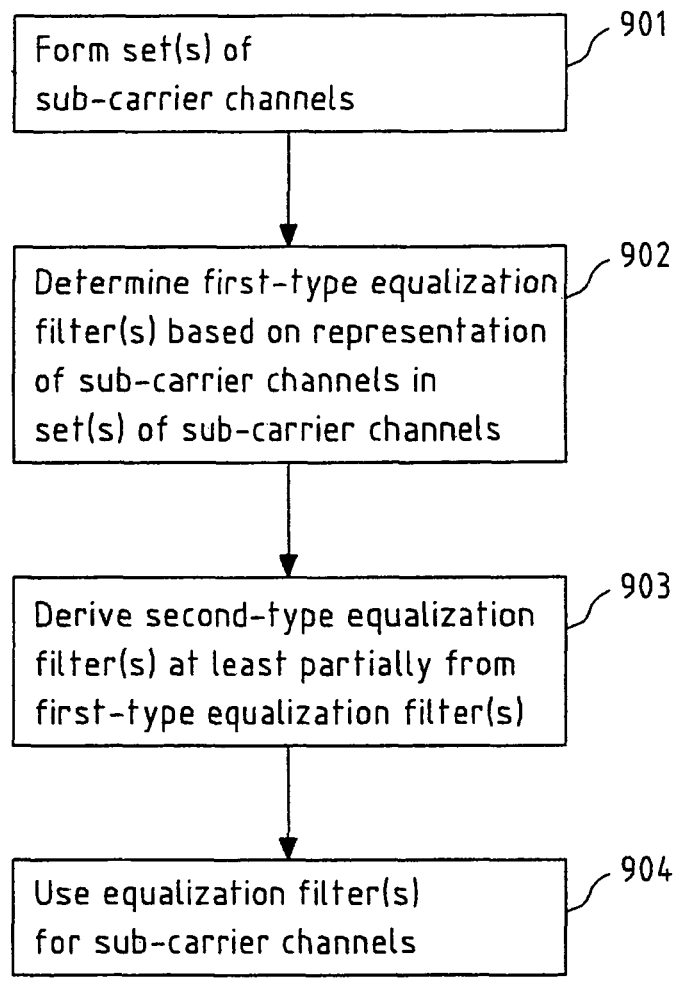
FIG. 9: an exemplary flowchart of the method according to the present invention.

FIG. 9 finally depicts an exemplary flowchart of a method according to the present invention. In a first step 901, sets of sub-carrier channels are formed. This step may comprise the determination of a suited size of said sets of sub-carriers. In a second step 902, first-type equalization filters are determined for said sets, wherein said first-type equalization filters are based on representations of said sub-carrier channels. Said representations may for instance be estimates or measurements of said sub-carrier channels, or averages taken over several of said estimates or measurements of said sub-carrier channels. In a third step 903, then second-type equalization filters are at least partially derived from said first-type equalization filters, for instance via inter- and extrapolation techniques.

Finally, in a fourth step 904, said first- and second-type equalization filters are used to equalize said sub-carrier channels.

It should be noted that there are alternative ways and variations of the present invention which are obvious to a skilled person in the art and can be implemented without deviating from the scope and spirit of the appended claims. In particular, all kinds of pre- and/or post equalization techniques can be applied to the sub-carrier channels. The present invention is not limited to the frequency domain as transformation domain, also other transformation domains such as the Hilbert, wavelet or filter bank domain or any other domain that allows to represent the transmission channels by means of orthogonal sub-carriers are applicable. The present invention may also be applied in systems that use spreading and/or scrambling codes in either the time or frequency domain, as it is for instance the case in the UMTS Terrestrial Radio Access Time Division Duplex (UTRA-TDD) system. The present invention is further not limited to wireless transmission systems, but may also be applied in wire-bound transmission systems such as for instance Multi-tone systems. The present invention is furthermore applicable to multi-user systems as well as to single user systems. Whenever a transmitter with $M_T$ transmit antenna elements was mentioned, this can be understood to correspond to a scenario wherein $M_T$ single-antenna users transmit signals, and whenever a receiver with $M_R$ receive antenna elements was mentioned, this can be understood to correspond to a scenario wherein $M_R$ single-antenna users receive signals. Furthermore, for the sake of simplicity of presentation, if was assumed that in pure pre-equalization, the number of signals transmitted over the channel equals the number of receive antenna elements (or single-antenna receivers) $M_R$. It is understood that pre-equalization can equally well be configured to transmit the same signal to two or more receive antenna elements. The same holds for pure post-equalization, wherein it was assumed that the number of signals transmitted over the transmission channel equals the number of transmit antenna elements (or single-antenna transmitters) $M_T$.

The invention claimed is:

1. A method comprising:
   determining a respective set of equalization filters for respective equalization of at least first and second sub-carrier channels of each of at least two sets of sub-carrier channels of a frequency-selective transmission channel, wherein said frequency-selective transmission channel has $M_T$ inputs and $M_R$ outputs, and $M_T$ and $M_R$ are integers wherein said frequency-selective transmission channel can be represented in a transformation domain based on N orthogonal sub-carriers, and
   wherein transmission characteristics, from said $M_T$ inputs to said $M_R$ outputs of said transmission channel, for each of said N respective orthogonal sub-carriers in said transformation domain, are represented by said at least two sets of sub-carrier channels,
   wherein the at least two sets of sub-carrier channels each comprise at least a first sub-carrier channel and a second sub-carrier channel of said N sub-carrier channels and
   wherein allocation of subcarrier channels is regulated so as to ensure that a number of sub-carrier channels in each of said at least two sets of sub-carrier channels is not equal to the number of subcarrier channels in any other sets of subcarrier channels,
   wherein for each of said at least two sets of sub-carrier channels, the respective set of equalization filters for respective equalization of said at least said first and second sub-carrier channels is determined based on a representation of at least the first sub-carrier channel of each of said at least two sets of sub-carrier channels,
   wherein the set of equalization filters comprises at least a first equalization filter, of a first type, for equalization of the first sub-carrier channel and a second equalization filter, of a second type, for equalization of the second sub-carrier channel, and
   wherein the second equalization filter is configured to perform signal adjustment equal to that of the first equalization filter and to include at least one transmit weight vector equal to a corresponding transmit weight vector of the first equalization filter; and
   performing respective equalization on the at least first and second sub-carrier channels of each of the at least two sets of subcarrier channels of the frequency-selective transmission channel using the set of equalization filters, wherein the equalization is performed approximately simultaneously on different sub-carrier channels of the at least first and second sub-carrier channels of each of the at least two sets of subcarrier channels by the first and second equalization filters.

2. The method according to claim 1, wherein said transformation domain is a frequency domain and wherein said N orthogonal sub-carriers are orthogonal frequency sub-carriers.

3. The method according to claim 1, wherein at least one signal, which is composed of a sequence of symbols, is transmitted over said transmission channel to obtain $M_R$ receive signals, and
   wherein each of said respective symbols is only affected by one respective sub-carrier channel of said at least two sets of sub-carrier channels during said transmission.

4. The method according to claim 3, wherein said at least one signal is at least subject to an Inverse Fourier Transform IFT before being transmitted over said transmission channel, and
   wherein said $M_R$ receive signals are at least subject to a Fourier Transform FT after reception.

5. The method according to claim 1, wherein at least one signal, which is composed of a sequence of symbols, is transmitted over said transmission channel to obtain $M_R$ receive signals, and
   wherein each of said symbols is affected by all of said at least two sets of sub-carrier channels during said transmission.

6. The method according to claim 3, wherein a cyclic prefix is added to said at least one signal before its transmission, or wherein a prefix is removed from said $M_R$ receive signals after their reception, or both.

7. The method according to claim 3, wherein said equalization filters are provided at a transmit site of said transmission channel and applied to said at least one signal before said at least one signal is transmitted over said transmission channel.

8. The method according to claim 3, wherein said equalization filters are provided at a receive site of said transmission channel and applied to said $M_R$ receive signals after said $M_R$ receive signals have been received.

9. The method according to claim 3, wherein said equalization filters are provided both at a transmit site and a receive site of said transmission channel and applied to said at least one signal before said at least one signal is transmitted over said transmission channel and to said $M_R$ receive signals after said $M_R$ receive signals have been received.

10. The method according to claim 3, wherein said equalization filters are at least partially designed to compensate for attenuations in at least one sub-carrier channel.

11. The method according to claim 7, wherein an equalization filter of said equalization filters defines a transmit weight vector for each of said at least one signal,
wherein each of said transmit weight vectors for said at least one signal projects components of said at least one signal at a respective orthogonal sub-carrier in said transformation domain onto the $M_T$ inputs of said respective sub-carrier channel, and
wherein the components of said $M_R$ receive signals output by the $M_R$ outputs of said respective sub-carrier channels represent components of $M_R$ reconstructed signals.

12. The method according to claim 8, wherein an equalization filter of said equalization filters defines a receive weight vector for each of $M_T$ signals, and
wherein each of said $M_T$ receive weight vectors combines components of said $M_R$ receive signals at a respective orthogonal sub-carrier in said transformation domain received at the $M_R$ outputs of said respective sub-carrier channels into components of one of $M_T$ reconstructed signals.

13. The method according to claim 9, wherein an equalization filter of said equalization filters defines:
a transmit weight vector for each of K signals, wherein each of said K transmit weight vectors projects components of one of said K signals at a respective orthogonal sub-carrier in said transformation domain onto the $M_T$ inputs; and
a corresponding receive weight vector for each of said K signals, wherein each of said receive weight vectors combines components of said $M_R$ receive signals at a respective orthogonal sub-carrier in said transformation domain received at the $M_R$ outputs of said respective sub-carrier channels into components of one of K reconstructed signals.

14. The method according to claim 11, wherein said $M_R$ receive signals are subject to noise, and
wherein said equalization filters are chosen to increase the Signal-to-Noise Ratio or the Signal-to-Noise-and-Interference Ratio of at least one of said reconstructed signals.

15. The method according to claim 11, wherein said equalization filters are chosen to increase a Signal-to-Interference Ratio of at least one of said reconstructed signals.

16. The method according to claim 1, wherein at least two equalization filters associated with at least two respective signals are chosen to create at least two substantially orthogonal spatial transmission channels for a substantially orthogonal transmission of said at least two signals.

17. The method according to claim 1, wherein said representation of at least one sub-carrier channel of each of said at least two sets of sub-carrier channels is an estimate of at least one sub-carrier channel of each of said at least two sets of sub-carrier channels.

18. The method according to claim 1, wherein an equalization filter of said equalization filters is determined from an eigenvalue decomposition of a spatial covariance matrix of at least a part of said representation of at least one sub-carrier channel or from a generalized eigenvalue decomposition based on a first spatial covariance matrix of a first part of said representation of at least one sub-carrier channel and a second spatial covariance matrix of a second part of said representation of at least one sub-carrier channel.

19. The method according to claim 1, wherein an equalization filter of said set of equalization filters is a Zero-Forcing filter or a Minimum Mean Square Error filter.

20. The method according to claim 1, wherein said an equalization filter of said set of equalization filters is at least partially determined from a singular value decomposition of said representation of at least one sub-carrier channel or from an eigenvalue decomposition, a Cholesky decomposition or a QR decomposition of said representation of at least one sub-carrier channel.

21. The method according to claim 1, wherein an equalization filter of said set of equalization filters is based on a water-filling solution.

22. The method according to claim 2, wherein a size $\tilde{B}$ of said at least two sets of sub-carrier channels depends on a coherence bandwidth of said frequency-selective transmission channel.

23. The method according to claim 22, wherein said size $\tilde{B}$ is adaptively controlled according to said coherence bandwidth of said frequency-selective transmission channel.

24. The method according to claim 22, wherein said coherence bandwidth corresponds to $\tilde{B}$ orthogonal sub-carrier separations, wherein said size is determined as the largest integer that is smaller or equal to $\tilde{B}$ and divides N, and wherein N/$\tilde{B}$ sets of adjacent sub-carrier channels are formed.

25. The method according to claim 22, wherein said representation of at least one sub-carrier channel for each of said at least two sets of sub-carrier channels is determined by averaging over $\tilde{B}$ estimates or measurements of the $\tilde{B}$ sub-carrier channels contained in each of said at least two sets of sub-carrier channels.

26. The method according to claim 22, wherein $\tilde{B}$ is a power of 2.

27. The method according to claim 1, wherein at least said set of equalization filters are at least partially fed back.

28. The method according to claim 27, wherein said feedback is absolute.

29. The method according to claim 27, wherein said feedback is differential, and wherein for at least one of said at least two sets of sub-carrier channels, no equalization filter of said set of equalization filters is fed back, and wherein, instead, differential information on an equalization filter of said set of equalization filters with respect to at least one equalization filter, of said set of equalization filters, of at least one different set of sub-carrier channels is fed back.

30. A non-transitory computer readable medium storing a program of instructions, execution of which by a processor configures
an apparatus to at least:
determine a respective set of equalization filters for respective equalization of at least first and second sub-carrier channels of each of at least two sets of sub-carrier channels of a frequency-selective transmission channel with $M_T$ inputs and $M_R$ outputs, wherein said transmission channel can be represented in a transformation domain based on N orthogonal sub-carriers channel, and wherein transmission characteristics, from said $M_T$ inputs to said $M_R$ outputs of said transmission channel, for each of said N respective orthogonal sub-carriers in said transformation domain, are represented by said at least two sets of sub-carrier channels, and wherein allocation of subcarrier channels is regulated so as to ensure that a number of sub-carrier channels in said at least two sets of sub-carrier channels is not equal to a number of subcarrier channels in any other sets of sub-carrier channels, wherein for each of said at least two sets of sub-carrier channels, the respective set of equalization filters for respective equalization of said at least the first and second sub-carrier channels is determined based on a representation of at least the first sub-carrier channel of each of said at least two sets of sub-carrier channels, wherein the set of equalization filters comprises at least a first equalization filter, of a first type, for equalization of the first sub-carrier channel and a second equalization filter, of a second type, for equalization of the second sub-carrier channel, and wherein the second equalization filter is configured to perform signal adjustment equal to that of the first equalization filter and to include at least one transmit weight vector equal to a corresponding transmit weight vector of the first equalization filter; and perform respective equalization on the at least first and second sub-carrier channels of each of the at least two sets of subcarrier channels of the frequency-selective transmission channel using the set of equalization filters, wherein the equalization is performed approximately simultaneously on different sub-carrier channels of the at least first and second sub-carrier channels of each of the at least two sets of subcarrier channels using the first and second equalization filters.

31. An apparatus comprising:

at least one processor;

memory storing computer program code;

wherein the memory is configured to, with the at least one processor, cause the apparatus to at least:

use equalization filters for performing respective equalization on at least first and second sub-carrier channels of each of at least two sets of sub-carrier channels of a frequency-selective transmission channel with $M_T$ inputs and $M_R$ outputs, wherein said transmission channel can be represented in a transformation domain based on N orthogonal sub-carriers, and wherein transmission characteristics from said $M_T$ inputs to said $M_R$ outputs of said frequency-selective transmission channel for each of said N respective orthogonal sub-carriers in said transformation domain are represented by at least two sets of sub-carrier channels and wherein allocation of subcarrier channels is regulated so as to ensure that a number of sub-carrier channels in said at least two sets of sub-carrier channels is not equal to a number of subcarrier channels in any other sets of sub-carrier channels, wherein for each of said at least two sets of sub-carrier channels, a respective set of equalization filters for respective equalization of said at least the first and second sub-carrier channels is determined based on a representation of at least the first sub-carrier channel of said respective set of the at least two sets of sub-carrier channels, wherein the respective set of equalization filters comprises at least a first equalization filter, of a first type, for equalization of the first sub-carrier channel and a second equalization filter, of a second type, for equalization of the second sub-carrier channel, and wherein the second equalization filter performs signal adjustment equal to that of the first equalization filter and includes at least one transmit weight vector equal to a corresponding transmit weight vector of the first equalization filter, and performing respective equalization on the at least first and second sub-carrier channels of each of the at least two sets of subcarrier channels of the frequency-selective transmission channel using the set of equalization filters, wherein the respective equalization is performed approximately simultaneously on different sub-carrier channels of the at least first and second sub-carrier channels of each of the at least two sets of subcarrier channels by the first and second equalization filters.

32. The apparatus according to claim 31, wherein the number of sub-carrier channels in each of said at least two sets of sub-carrier channels is not equal.

33. The apparatus according to claim 31, wherein said transformation domain is a frequency domain and wherein said N orthogonal sub-carriers are orthogonal frequency sub-carriers.

34. The apparatus according to claim 31, wherein at least one signal, which is composed of a sequence of symbols, is transmitted over said transmission channel to obtain $M_R$ receive signals, and wherein each of said respective symbols is only affected by one respective sub-carrier channel of said at least two sets of sub-carrier channels during said transmission.

35. The apparatus according to claim 34, wherein said at least one signal is at least subject to an Inverse Fourier Transform IFT before being transmitted over said transmission channel, and wherein said $M_R$ receive signals are at least subject to a Fourier Transform FT after reception.

36. The apparatus according to claim 31, wherein at least one signal, which is composed of a sequence of symbols, is transmitted over said transmission channel to obtain $M_R$ receive signals, and wherein each of said symbols is affected by all of said at least two sets of sub-carrier channels during said transmission.

37. The apparatus according to claim 34, wherein a cyclic prefix is added to said at least one signal before its transmission, or wherein a prefix is removed from said $M_R$ receive signals after their reception, or both.

38. The apparatus according to claim 34, wherein said set of equalization filters are provided at a transmit site of said transmission channel and applied to said at least one signal before said at least one signal is transmitted over said transmission channel.

39. The apparatus according to claim 34, wherein said set of equalization filters are provided at a receive site of said transmission channel and applied to said $M_R$ receive signals after said $M_R$ receive signals have been received.

40. The apparatus according to claim 34, wherein said set of equalization filters are provided both at a transmit site and a receive site of said transmission channel and applied to said at least one signal before said at least one signal is transmitted over said transmission channel and to said $M_R$ receive signals after said $M_R$ receive signals have been received.

41. The apparatus according to claim 34, wherein said set of equalization filters are at least partially designed to compensate for attenuations in at least one sub-carrier channel.

42. The apparatus according to claim 38, wherein an equalization filter of said set of equalization filters defines a transmit weight vector for each of said at least one signal,
   wherein each of said transmit weight vectors projects components of said at least one signal at a respective orthogonal sub-carrier in said transformation domain onto the $M_T$ inputs of said respective sub-carrier channel, and
   wherein the components of said $M_R$ receive signals output by the $M_R$ outputs of said respective sub-carrier channels represent components of $M_R$ reconstructed signals.

43. The apparatus according to claim 39, wherein an equalization filter of said set of equalization filters defines a receive weight vector for each of $M_T$ signals, and
   wherein each of said $M_T$ receive weight vectors combines components of said $M_R$ receive signals at a respective orthogonal sub-carrier in said transformation domain received at the $M_R$ outputs of said respective sub-carrier channels into components of one of $M_T$ reconstructed signals.

44. The apparatus according to claim 40, wherein an equalization filter of said set of equalization filters defines:
   a transmit weight vector for each of K signals, wherein each of said K transmit weight vectors projects components of one of said K signals at a respective orthogonal sub-carrier in said transformation domain onto the $M_T$ inputs; and
   a corresponding receive weight vector for each of said K signals, wherein each of said receive weight vectors combines components of said $M_R$ receive signals at a respective orthogonal sub-carrier in said transformation domain received at the $M_R$ outputs of said respective sub-carrier channels into components of one of K reconstructed signals.

45. The apparatus according to claim 42, wherein said $M_R$ receive signals are subject to noise, and
   wherein said equalization filters are chosen to increase a Signal-to-Noise Ratio or a Signal-to-Noise-and-Interference Ratio of at least one of said reconstructed signals.

46. The apparatus according to claim 42, wherein said set of equalization filters are chosen to increase a Signal-to-Interference Ratio of at least one of said reconstructed signals.

47. The apparatus according to claim 33, wherein a size $\tilde{B}$ of said at least two sets of sub-carrier channels depends on a coherence bandwidth of said frequency-selective transmission channel.

48. The apparatus according to claim 47, wherein said size is adaptively controlled according to said coherence bandwidth of said frequency-selective transmission channel.

49. The apparatus according to claim 47, wherein said coherence bandwidth corresponds to $\tilde{B}$ orthogonal sub-carrier separations,
   wherein said size $\tilde{B}$ is determined as the largest integer that is smaller or equal to $\tilde{B}$ and divides N, and wherein $N/\tilde{B}$ sets of adjacent sub-carrier channels are formed.

50. The apparatus according to claim 47, wherein said representation of at least one sub-carrier channel for each of said at least two sets of sub-carrier channels is determined by averaging over $\tilde{B}$ estimates or measurements of the $\tilde{B}$ sub-carrier channels contained in each of said at least two sets of sub-carrier channels.

51. The apparatus according to claim 47, wherein $\tilde{B}$ is a power of 2.

52. The apparatus according to claim 31, wherein at least said sets of equalization filters are at least partially fed back.

53. The apparatus according to claim 52, wherein said feed-back is absolute.

54. The apparatus according to claim 52, wherein said feed-back is differential, and wherein for at least one of said at least two sets of sub-carrier channels, no equalization filter of said set of equalization filters is fed back, and wherein, instead, differential information on an equalization filter of said set of equalization filters with respect to at least one equalization filter, of said set of equalization filters, of at least one different set of sub-carrier channels is fed back.

* * * * *